Sept. 8, 1942.          M. F. WEIDA                    2,295,246
                    PRETZEL MAKING MACHINE
                     Filed May 1, 1940          17 Sheets-Sheet 1

INVENTOR
                                          MILLARD F. WEIDA
                              BY
                                              ATTORNEYS

Sept. 8, 1942.  M. F. WEIDA  2,295,246
PRETZEL MAKING MACHINE
Filed May 1, 1940  17 Sheets-Sheet 2

INVENTOR
MILLARD F. WEIDA
BY
ATTORNEYS

Sept. 8, 1942.  M. F. WEIDA  2,295,246
PRETZEL MAKING MACHINE
Filed May 1, 1940  17 Sheets-Sheet 3
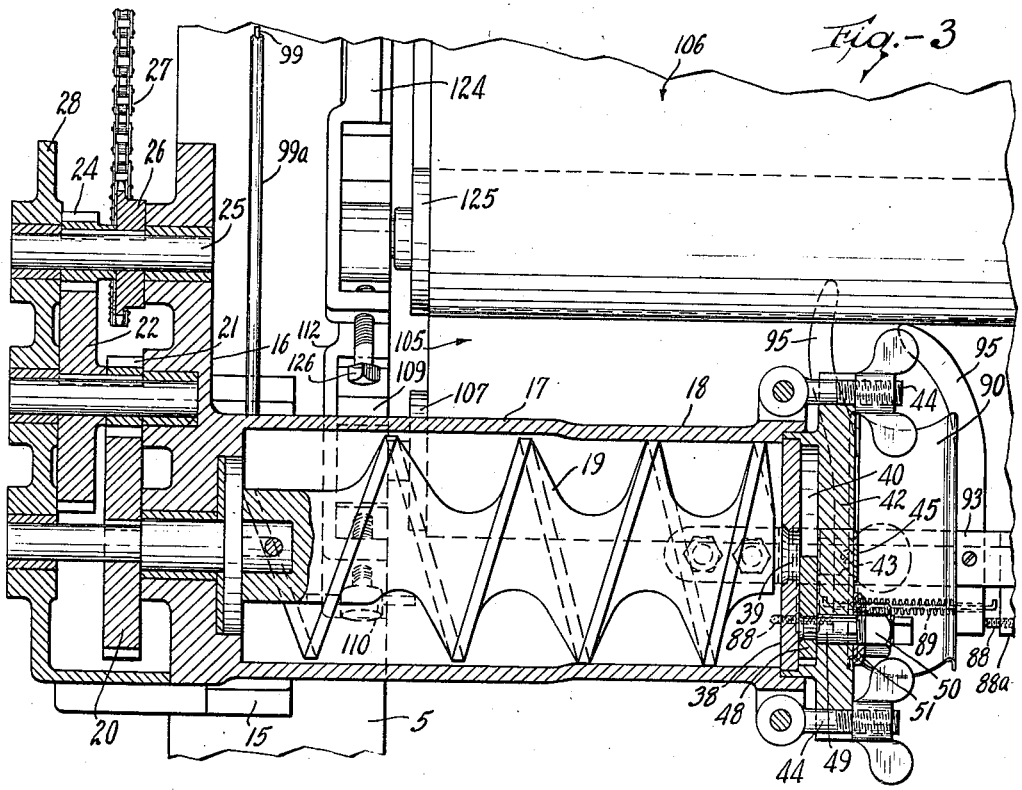
Fig.-3
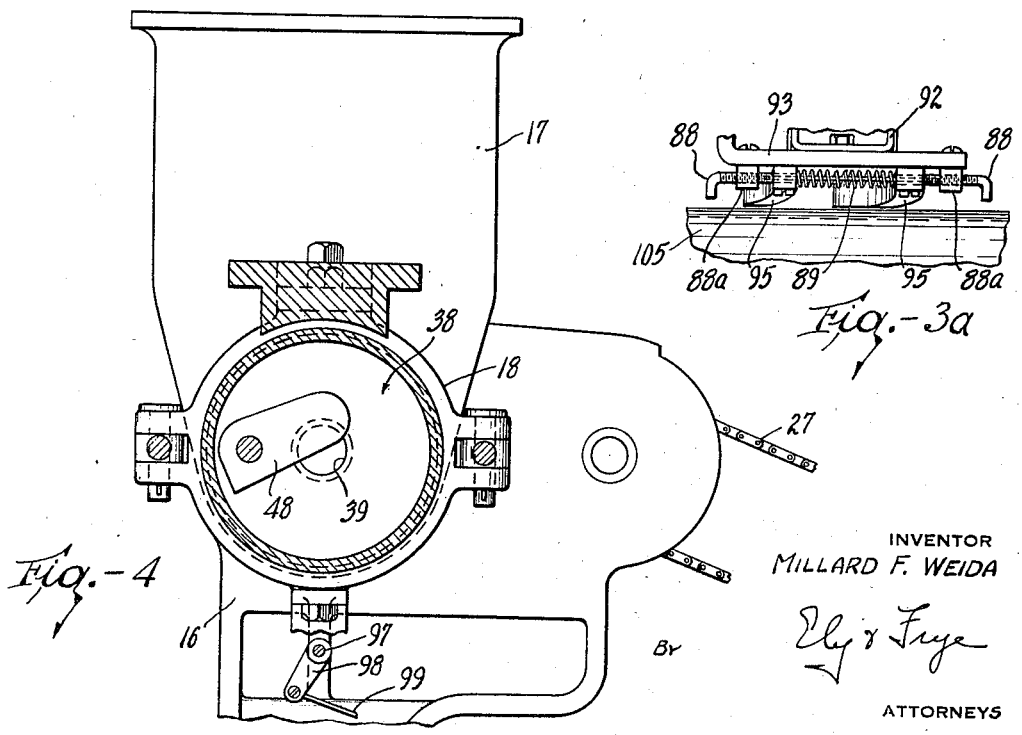
Fig.-4
Fig.-3a
INVENTOR
MILLARD F. WEIDA
ATTORNEYS

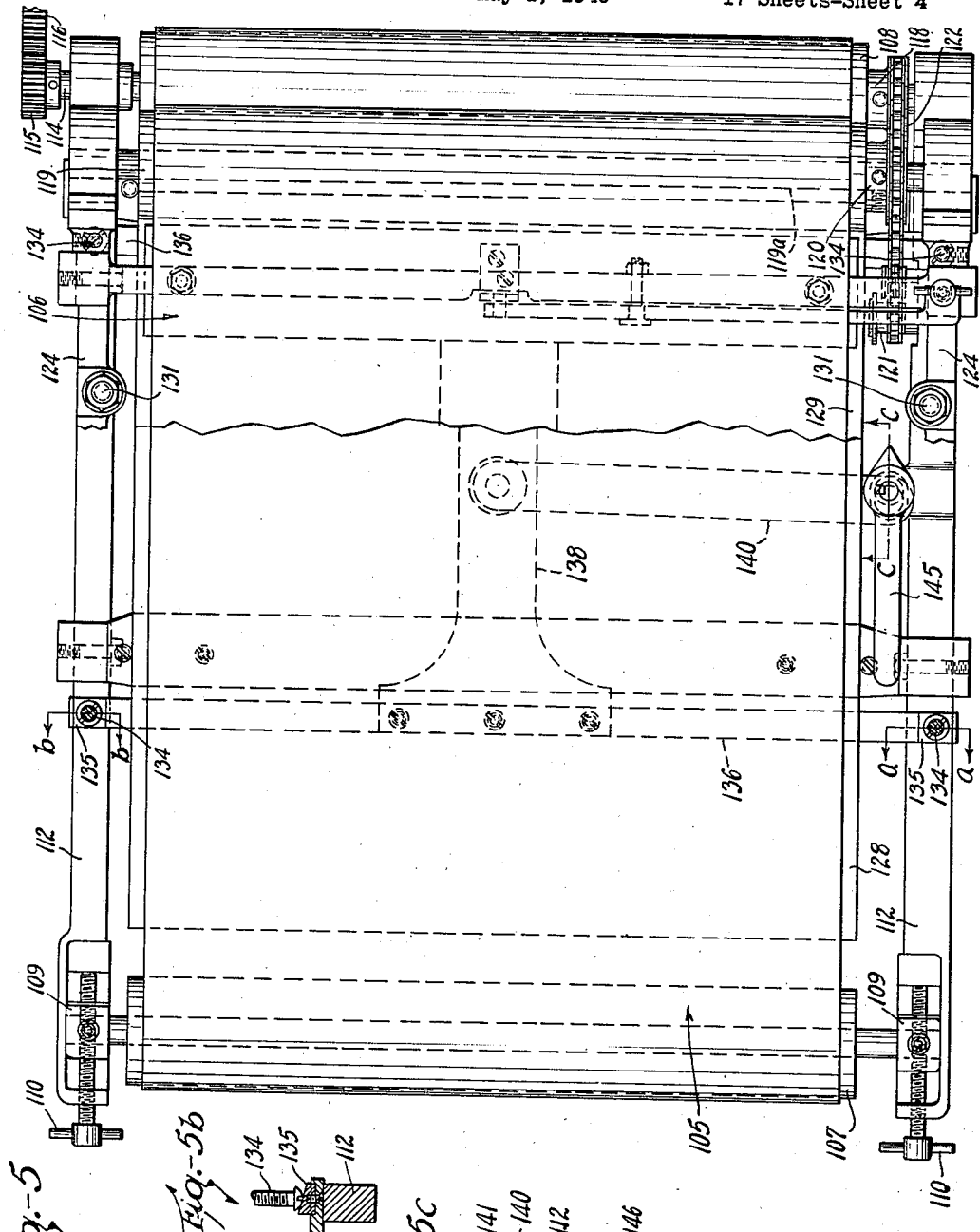

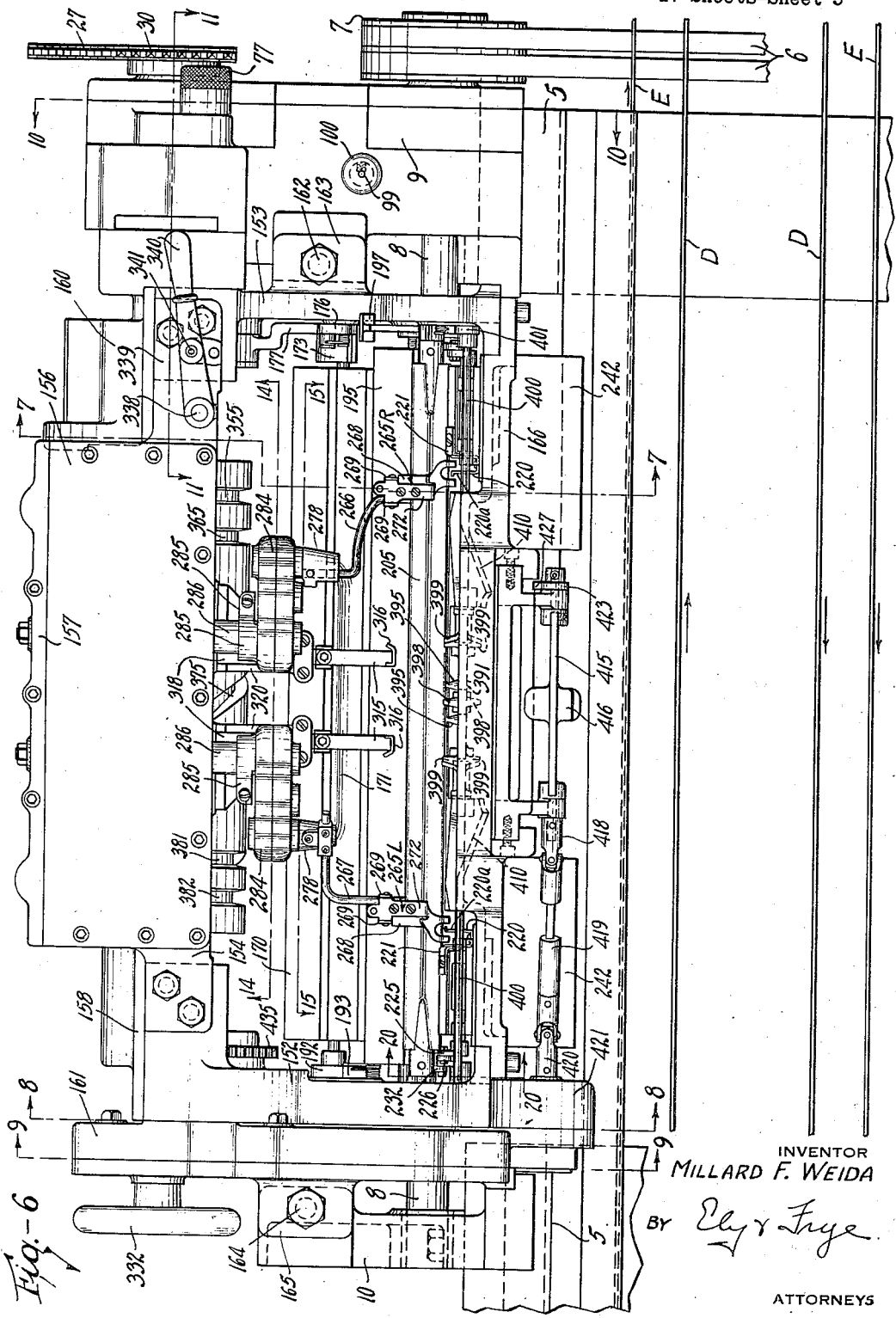

INVENTOR
MILLARD F. WEIDA

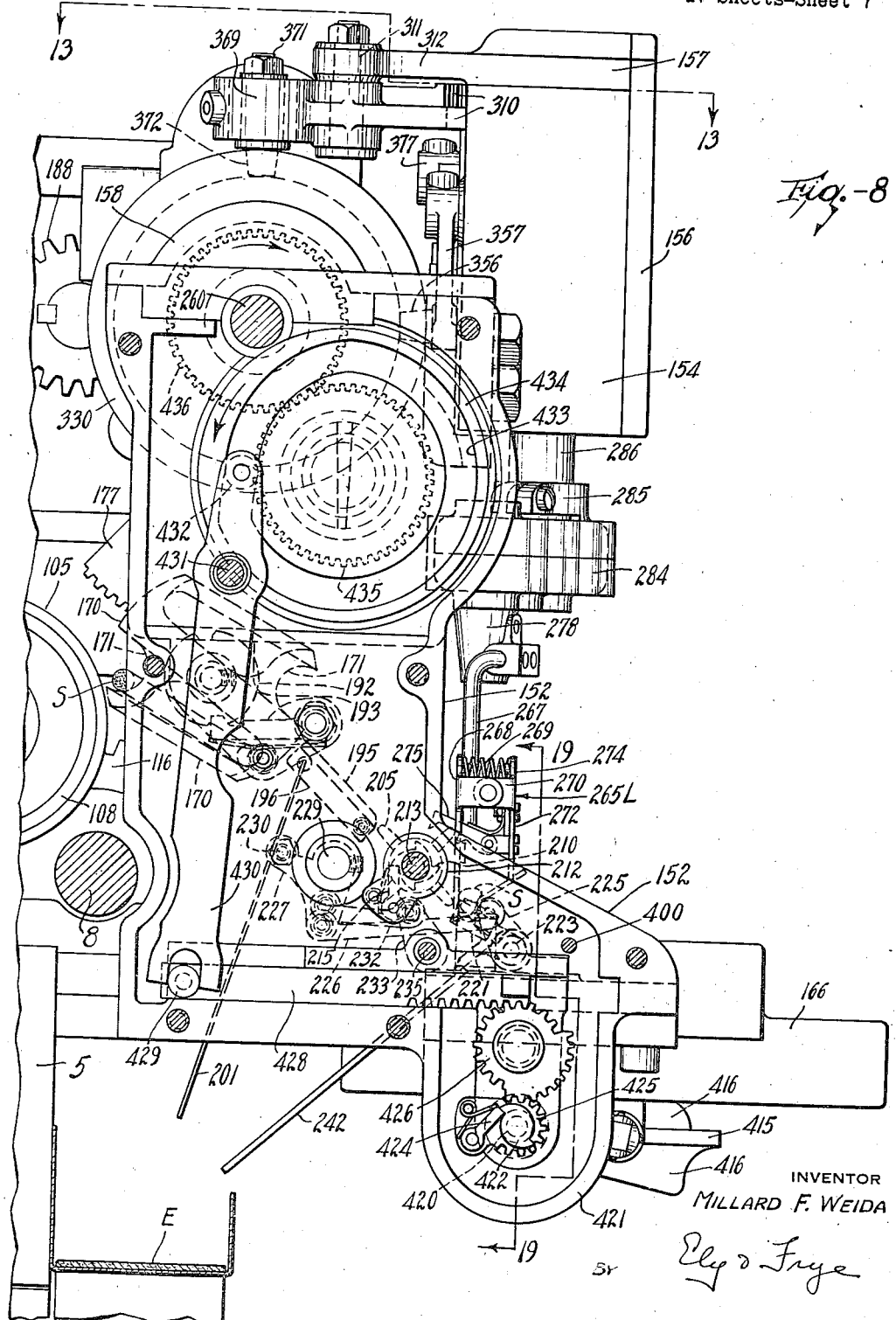

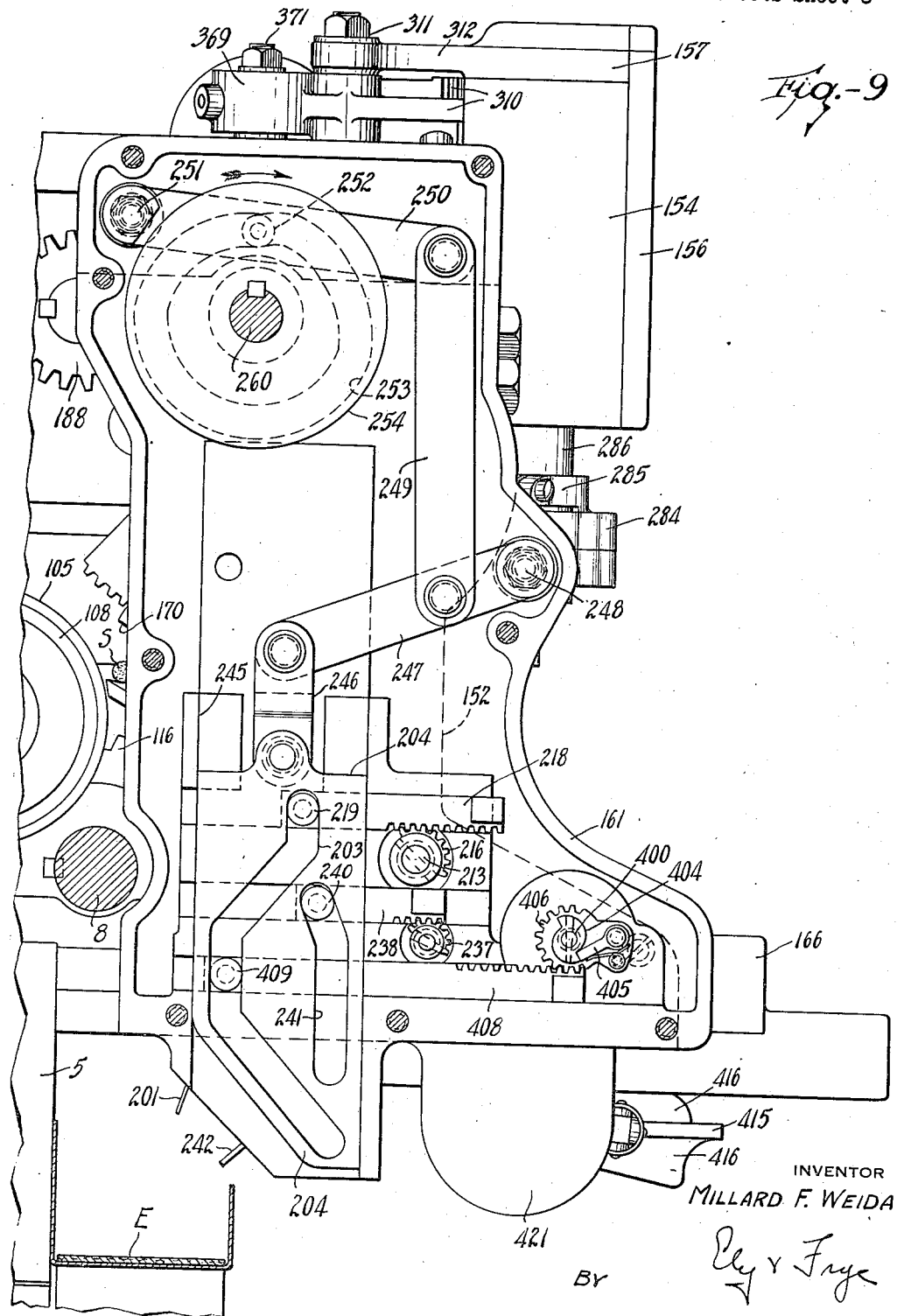

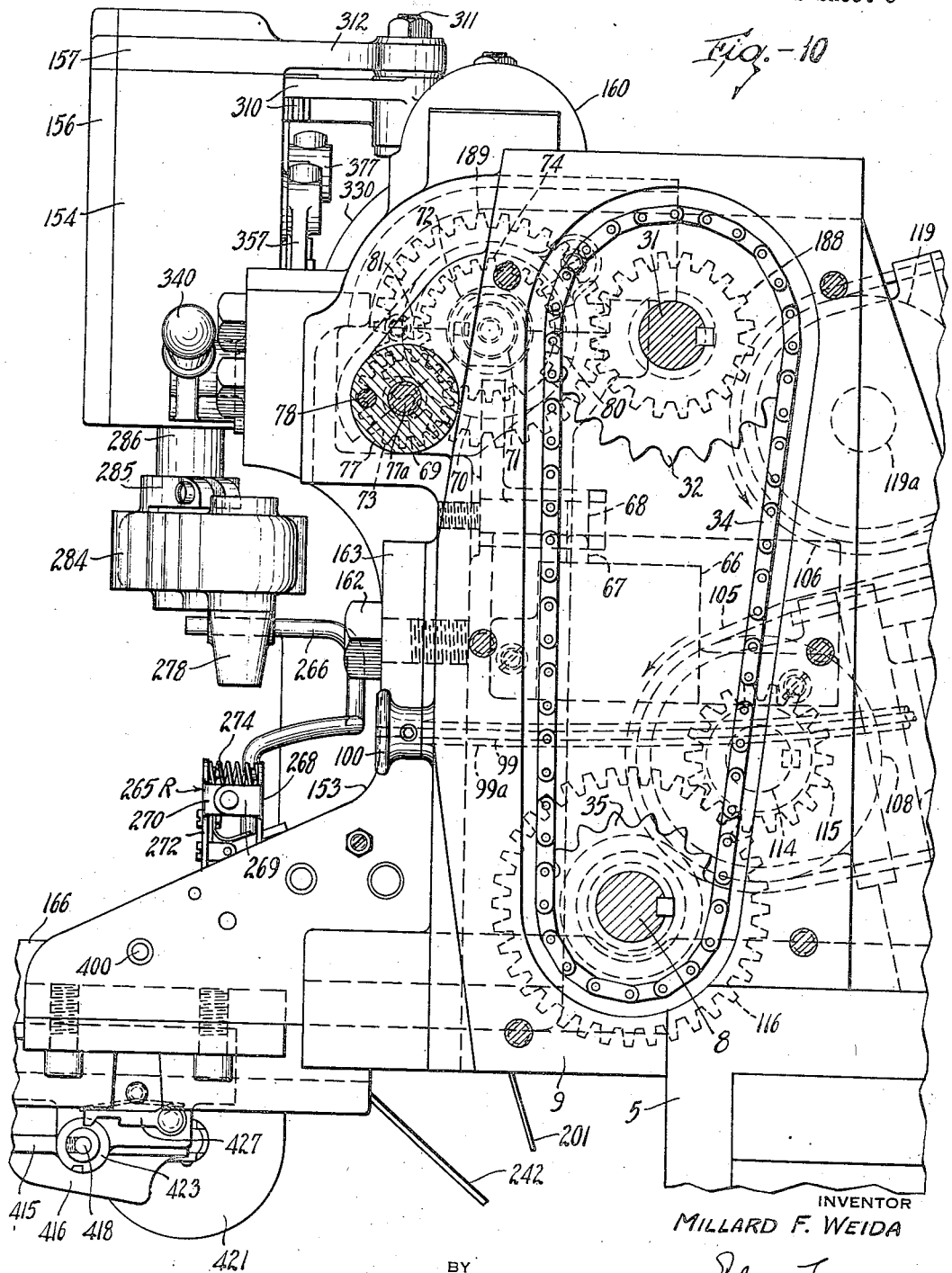

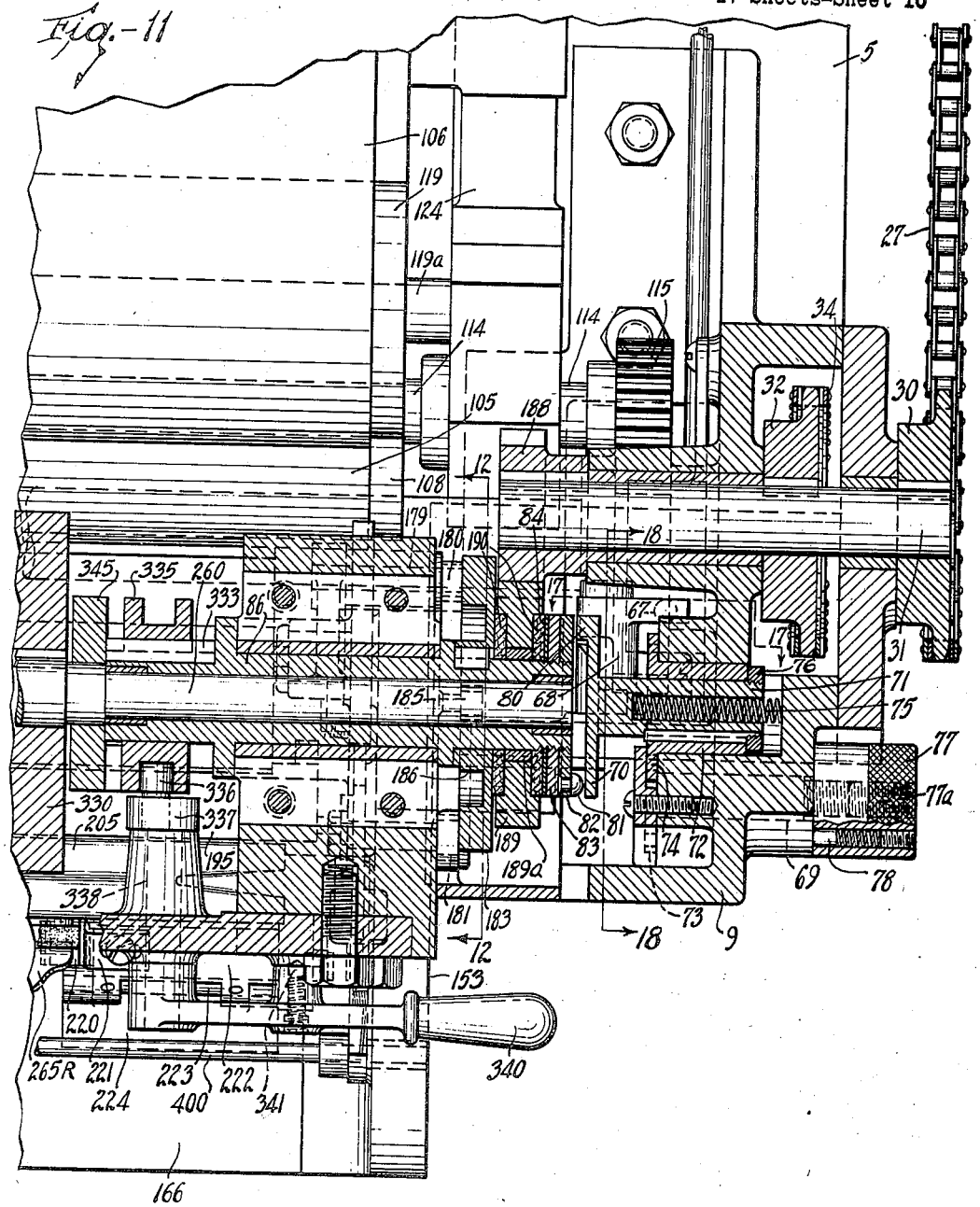

Sept. 8, 1942.                M. F. WEIDA                    2,295,246
                          PRETZEL MAKING MACHINE
                            Filed May 1, 1940              17 Sheets-Sheet 11
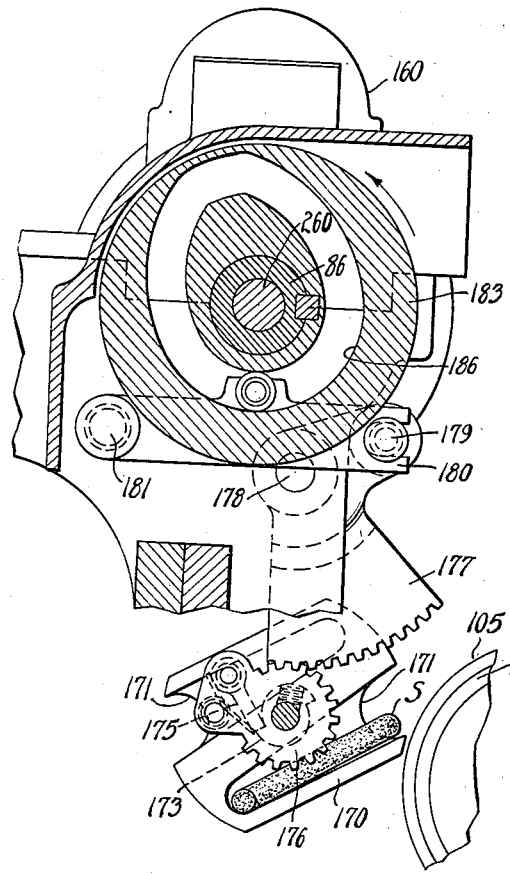
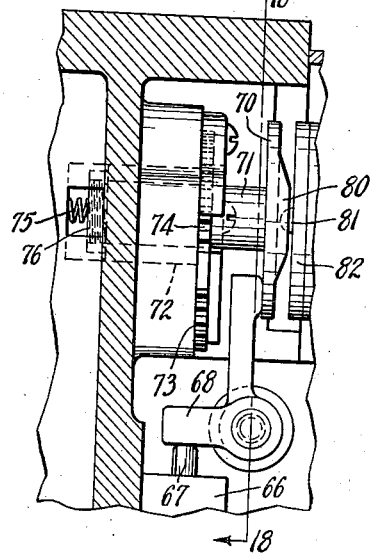
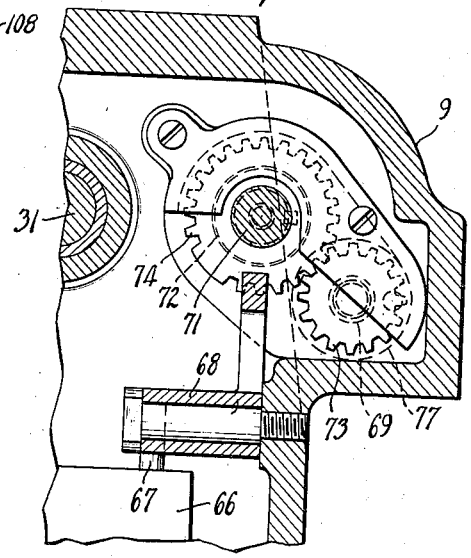
INVENTOR
MILLARD F. WEIDA
BY
Ely & Frye
ATTORNEYS

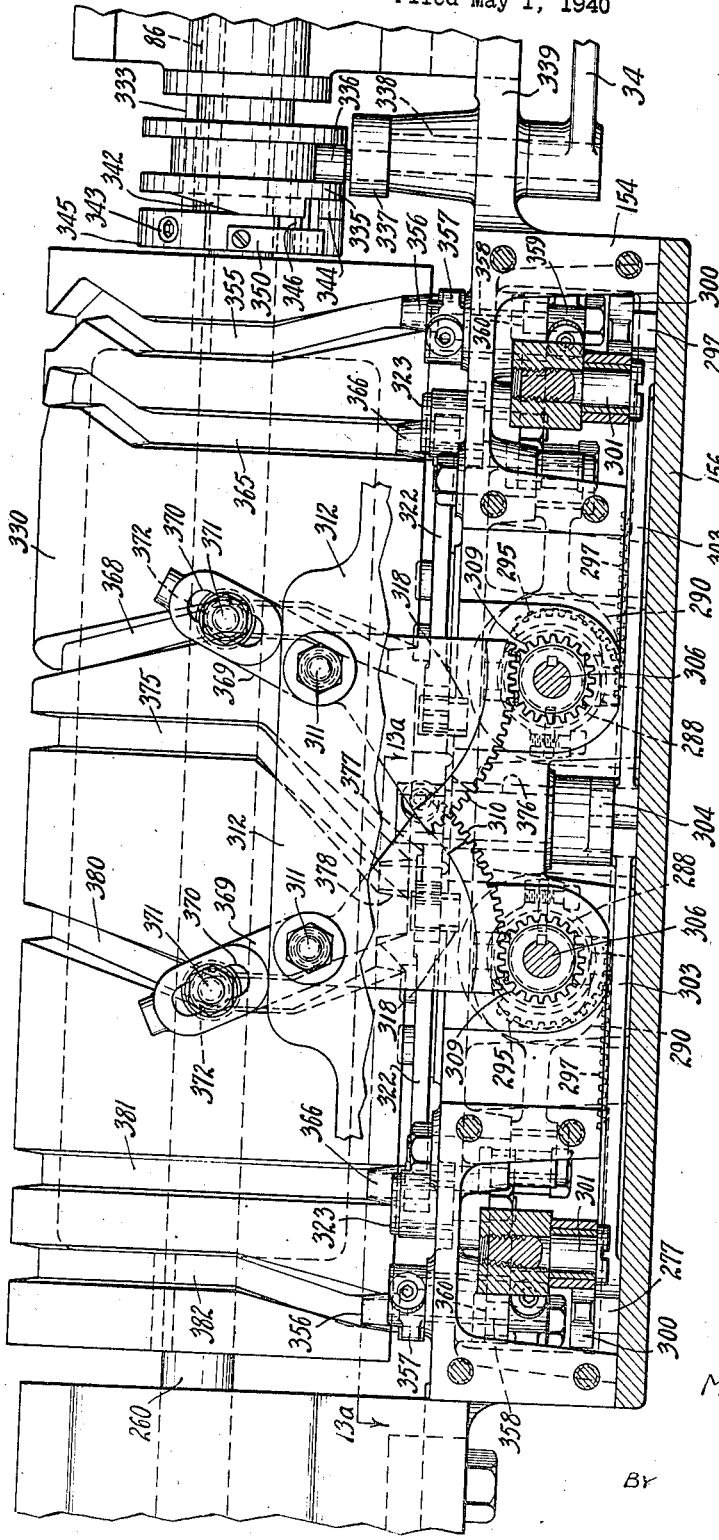

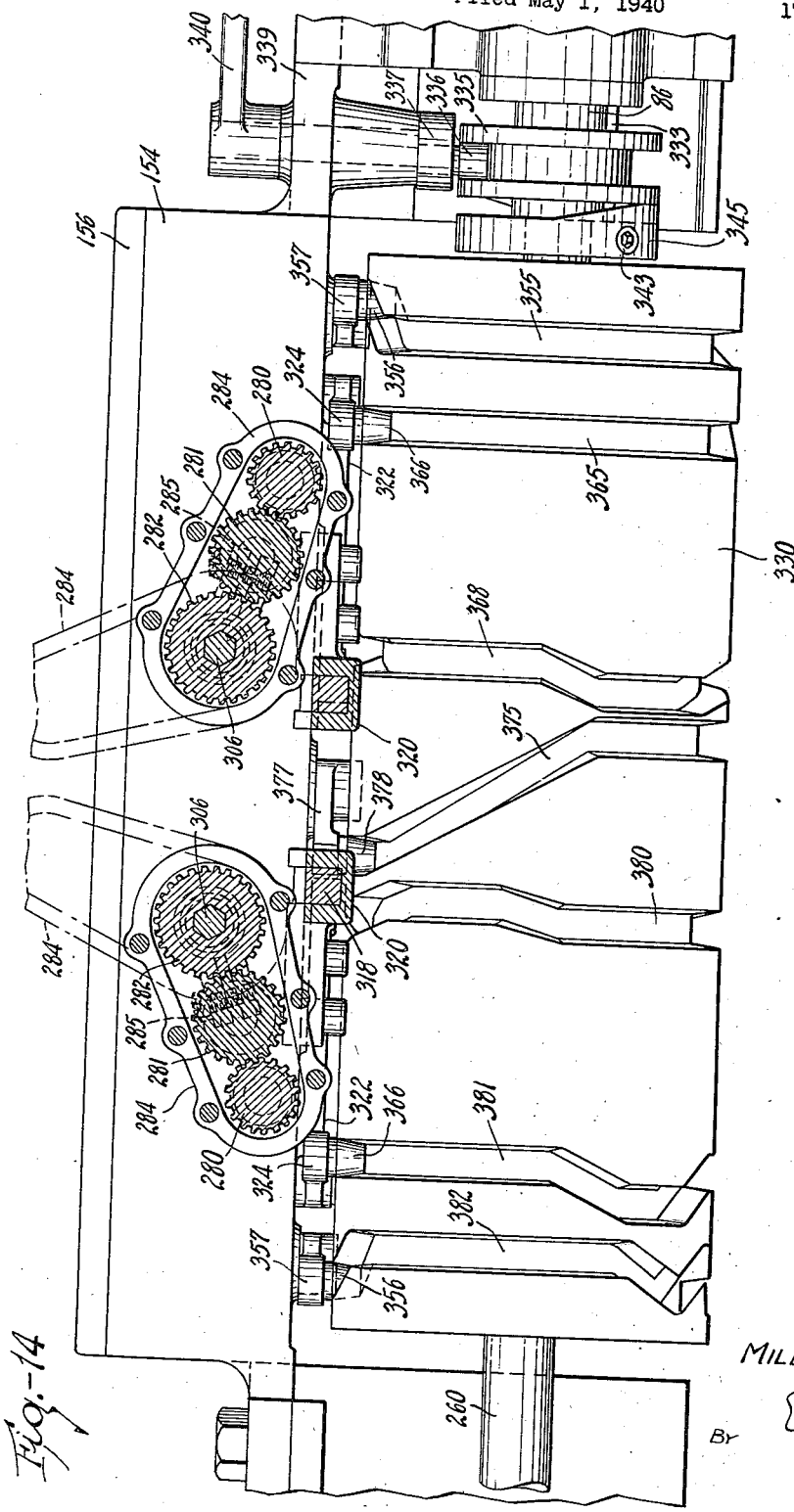

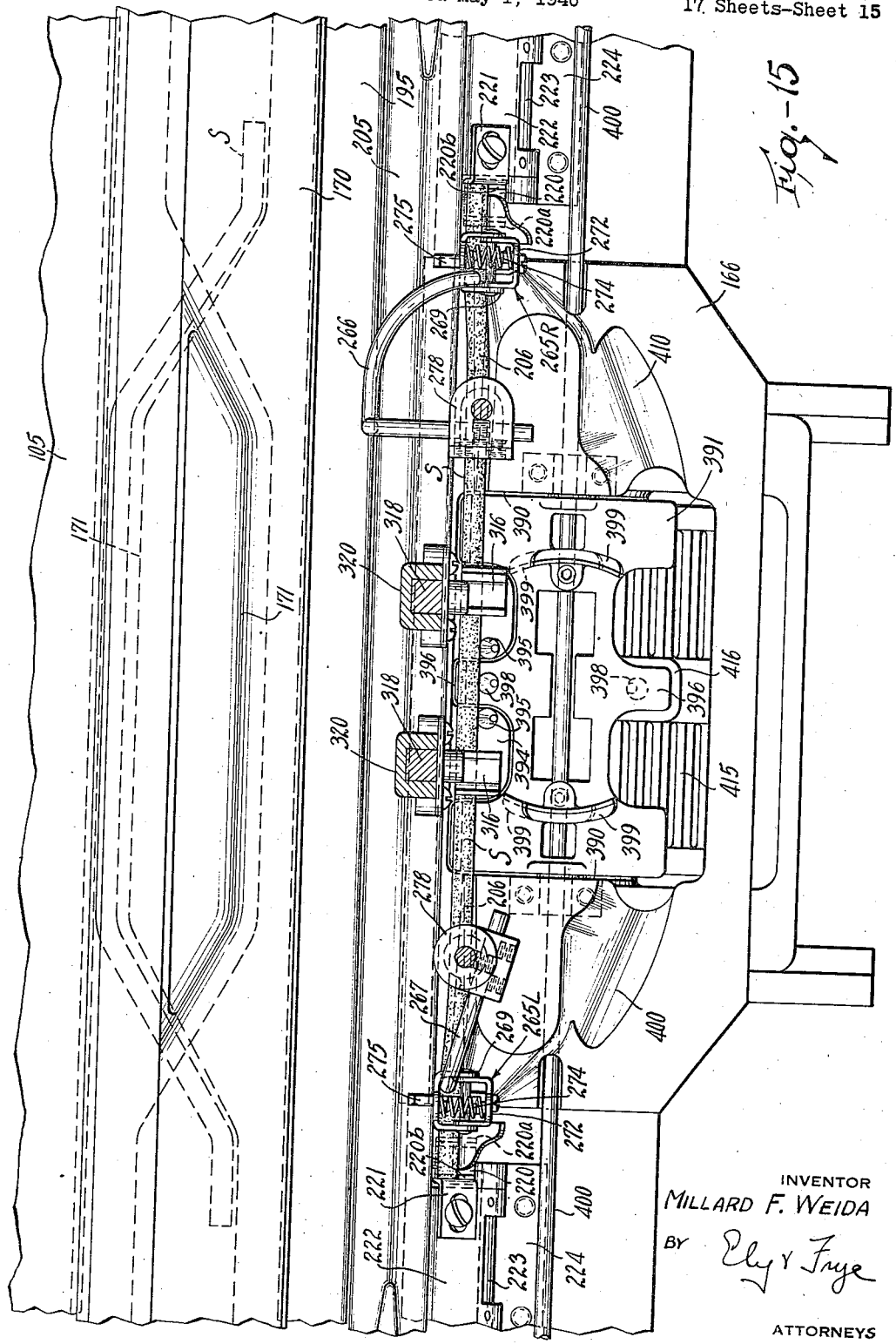

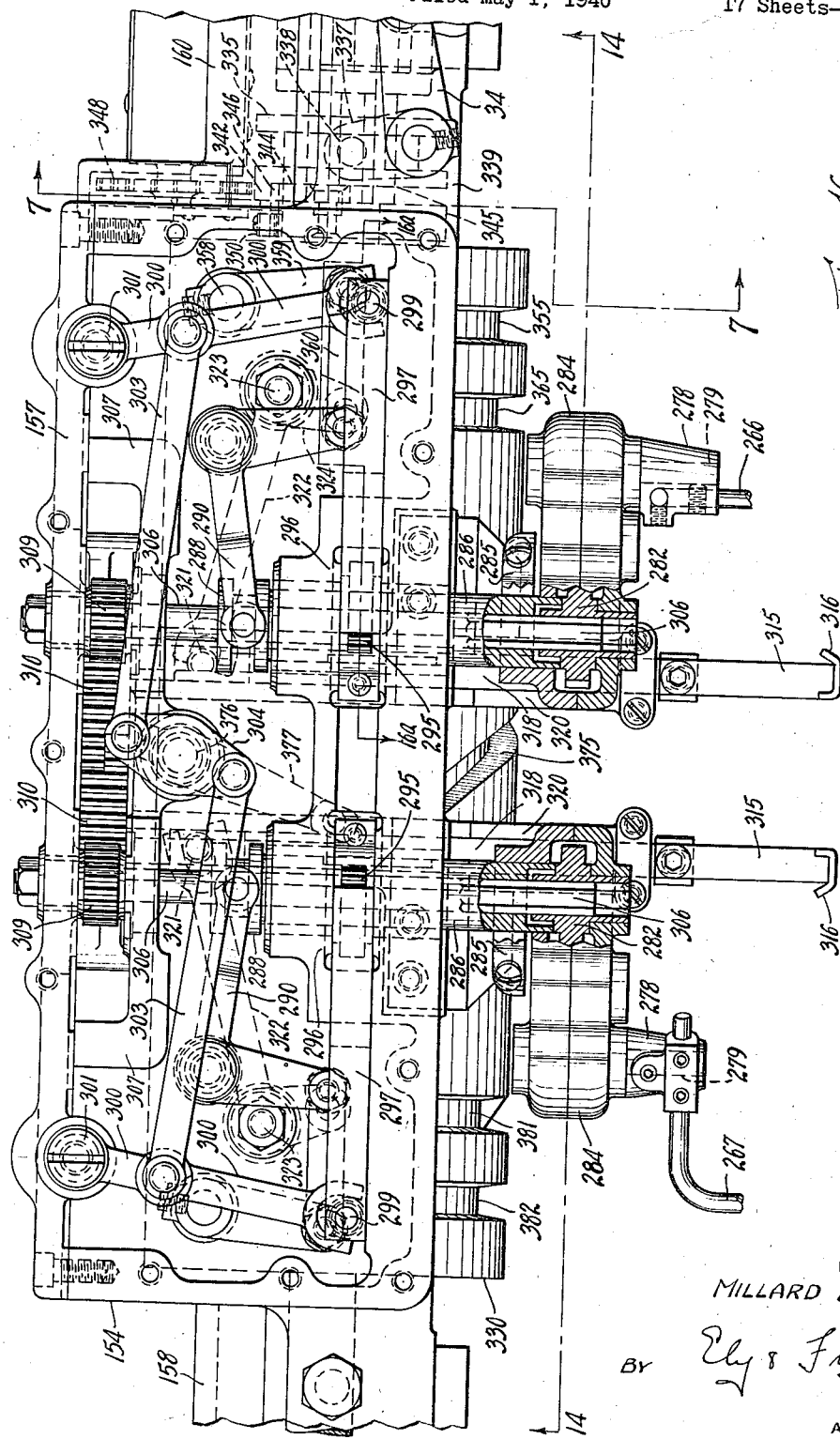

Sept. 8, 1942.   M. F. WEIDA   2,295,246
PRETZEL MAKING MACHINE
Filed May 1, 1940   17 Sheets-Sheet 17
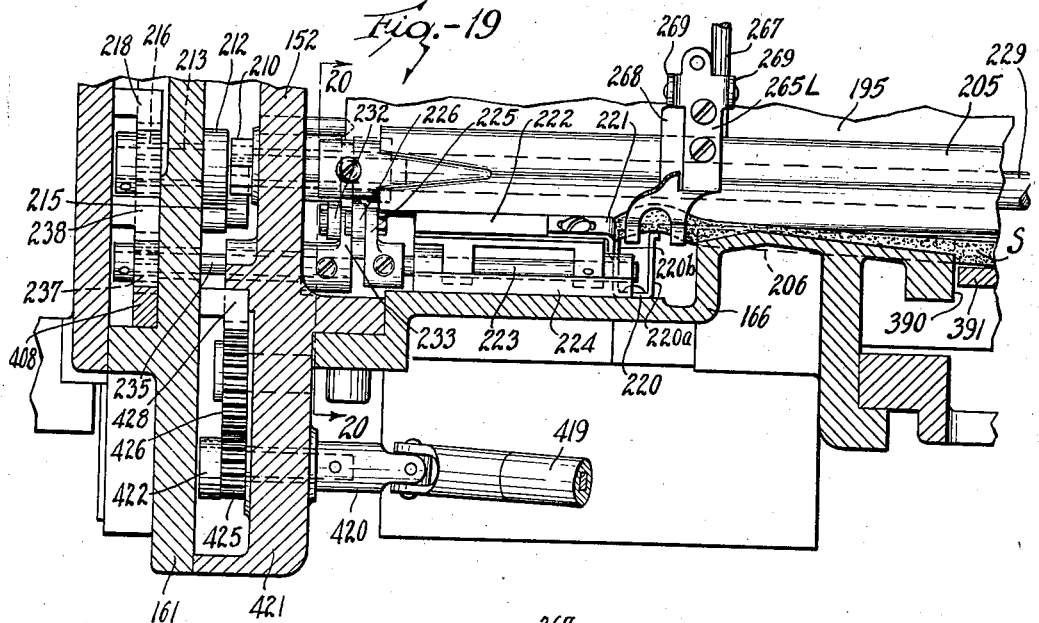
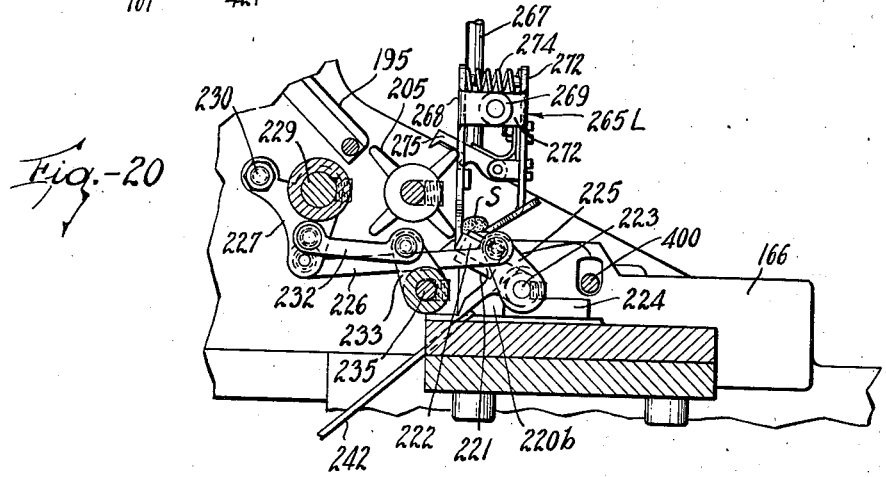
INVENTOR
MILLARD F. WEIDA
BY
ATTORNEY.

Patented Sept. 8, 1942

2,295,246

UNITED STATES PATENT OFFICE 2,295,246

PRETZEL MAKING MACHINE

Millard F. Weida, Canton, Ohio, assignor to The Curthalt Company, Canton, Ohio, a corporation of Ohio Application May 1, 1940, Serial No. 332,796

26 Claims. (Cl. 107—8)

This invention relates to machines for the manufacture of pretzels and has for its object improvement of machinery by which pretzels can be made automatically, thereby decreasing the cost of manufacture, reducing waste and making better and more uniform pretzels.

One of the objects of the invention is to combine the mechanism for forming the dough into dough sticks and the mechanism for subsequently tying the sticks into standard pretzel form in a single machine so that the entire operation of forming a complete pretzel from the dough will be carried on in a more rapid and satisfactory manner than has been possible heretofore.

It is also an object of the invention to improve upon the dough-stick forming mechanism so as to secure more uniform sticks. Uniformity of sticks, both as to length and diameter, greatly increases the efficiency and reduces the waste of the pretzel-tying unit which receives the sticks directly from the stick-forming device and converts the stick into pretzel form. The invention also has as an object a machine which is readily adaptable and adjustable for the manufacture of pretzels from sticks of varying diameters.

The pretzel-tying unit, which is employed as a part of the complete machine, is patterned after that shown in the patent to Curtis No. 2,107,749, dated Feb. 8, 1938, which discloses the sequence of operations and the general method of converting the stick of dough into pretzel form, but this invention improves upon the tying mechanism of the Curtis patent by increasing its productive capacity. The new machine shown herein also simplifies and improves upon the means employed for operating the arms which tie the dough stick, and reduces the number of working parts. This invention has reduced the cost of maintenance and repair of the Curtis machine and has lessened the periods during which the machine is idle owing to breakdowns and readjustments.

Other improvements and advantages over the prior devices for this general purpose will be realized. The machine as shown and described herein is the best known and preferred form of a complete automatic pretzel-making device which forms the dough stick to accurate dimensions, delivers the dough stick to the tying unit or head and delivers the completed pretzel to a moving belt or conveyor which, in turn, delivers the uncooked pretzel to the ovens. While the complete machine is shown and described in full detail, it is possible to change, modify or improve upon any of the various elements without departing from the principles of the invention or sacrificing any of its benefits.

The complete machine as shown herein contains a new and improved dough-lump measuring and cutting device which is the subject of divisional application, Serial No. 406,991, filed August 15, 1941.

In the drawings which show the machine:

Fig. 3 is a section on the line 3—3 of Figs. 1 and 2.

Fig. 3ª is a detail of the means for adjusting the rails which guide the dough lump to the rolling belts.

Figure 2:
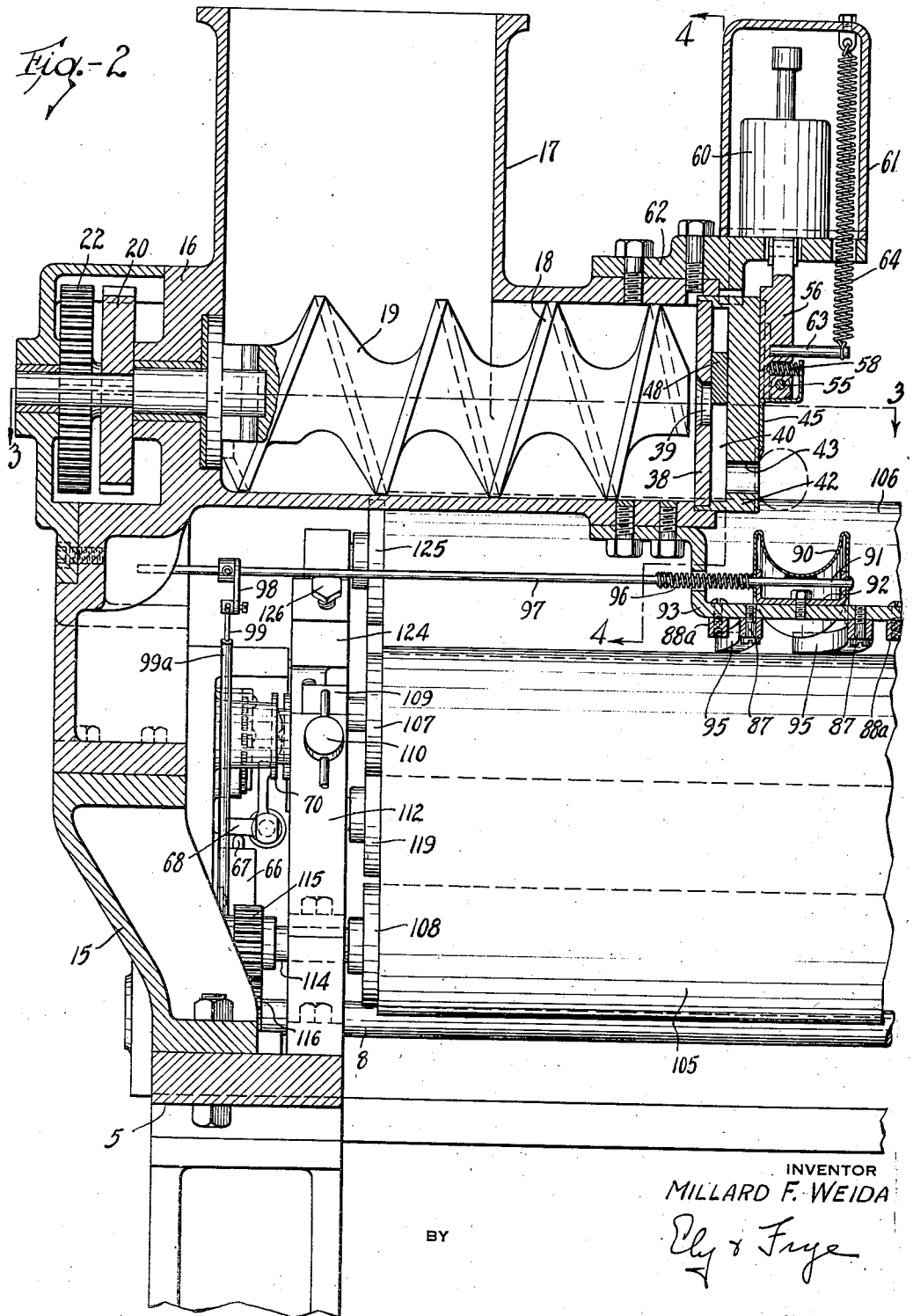
Fig. 2 is a section on the line 2—2 of Fig. 1, showing the "gob" forming mechanism by which the accurately measured lumps of dough are formed.

Fig. 4 is a section on the line 4—4 of Fig. 2, showing the adjustable gate or valve by which the amount of dough in each lump is regulated, thereby controlling the stick dimensions.

Fig. 5 is a plan view of the rolling belts, a part of the upper belt being cut away to show the lower belt.

Figs. 5ª, 5ᵇ, and 5ᶜ are sections on the lines a—a, b—b, and c—c of Fig. 5, showing details of the belt adjustment.

Fig. 6 is a front elevation of the head with the tying arms in position to pick up the ends of the stick.

Figures 7, 7A:
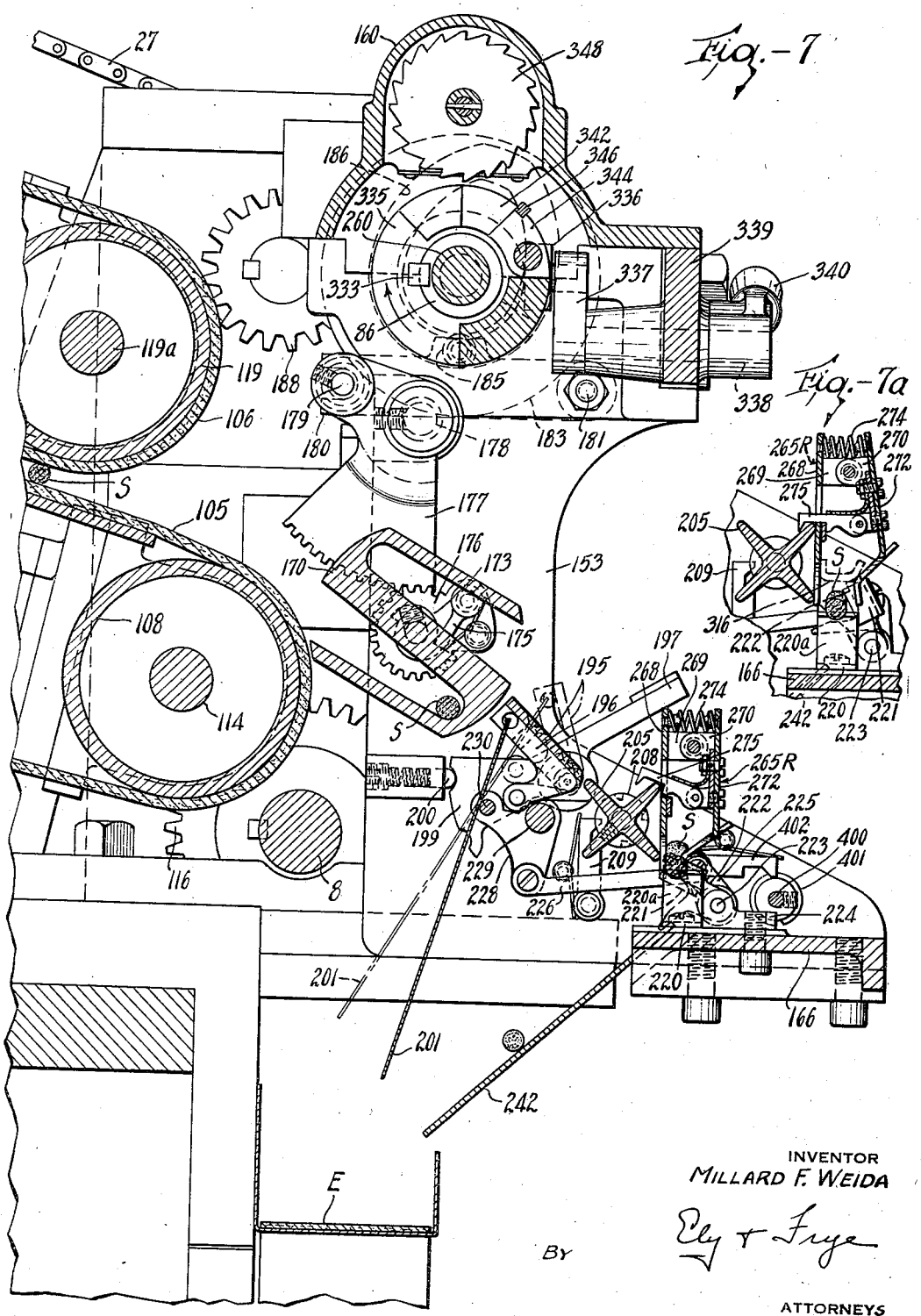

Fig. 7 is a vertical section taken on the line 7—7 of Fig. 6 at the discharge end of the rolling belts, showing certain details of the head and the transfer device by which the stick is moved into position for the tying operation.

Fig. 7ª is a detail showing one gripper for the stick in its open position ready to close about the end of a stick.

Fig. 8 is a section on the line 8—8 of Fig. 6.

Fig. 9 is a section on the line 9—9 of Fig. 6.

Fig. 10 is a vertical section on the right hand side of the head taken on the line 10—10 of Fig. 6.

Fig. 11 is a horizontal section on the line 11—11 of Fig. 6, showing the means by which the dough-stick forming unit is driven in synchronism with the tying unit and the timing device by which these operations are brought into step.

Fig. 12 is a section on the line 12—12 of Fig. 11.

Figure 13A:
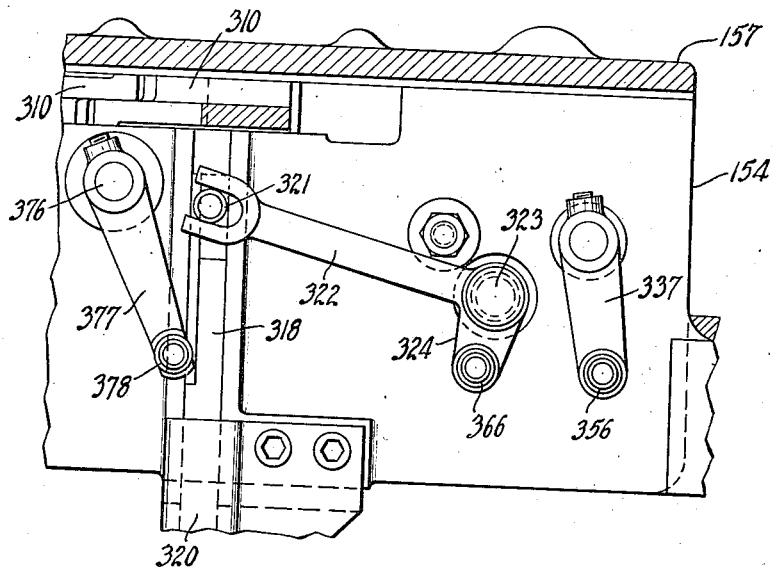

Fig. 13 is a horizontal section on the line 13—13 of Fig. 8.

Fig. 13ª is a section on the line 13ª—13ª of Fig. 13.

Figure 16A:
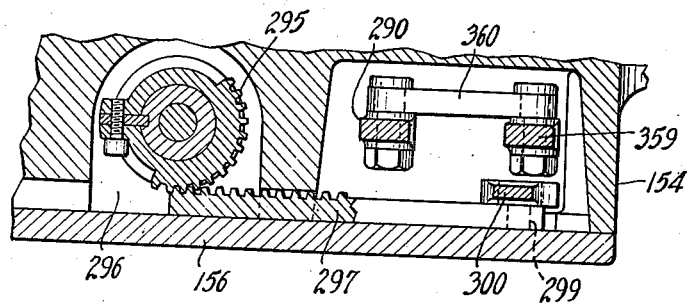

Fig. 14 is a section on the line 14—14 of Figs. 6 and 16, looking upwardly.

Fig. 15 is a section on the line 15—15 of Fig. 6, taken just below Fig. 14, but looking downwardly.

Fig. 16 is a front elevation of the head with the cover plate removed and portions of the operating arms in section.

Fig. 16ª is a horizontal section on the line 16ª—16ª of Fig. 16.

Fig. 17 is an enlarged detail on the line 17—17 of Fig. 11 of the knife actuating means by which the timing of the knife for cutting off the lump of dough is controlled.

Fig. 18 is a section on the line 18—18 of Figs. 11 and 17.

Fig. 19 is an enlarged section on the line 19—19 of Fig. 8; and

Fig. 20 is a section on the line 20—20 of Fig. 19.

Figure 1:
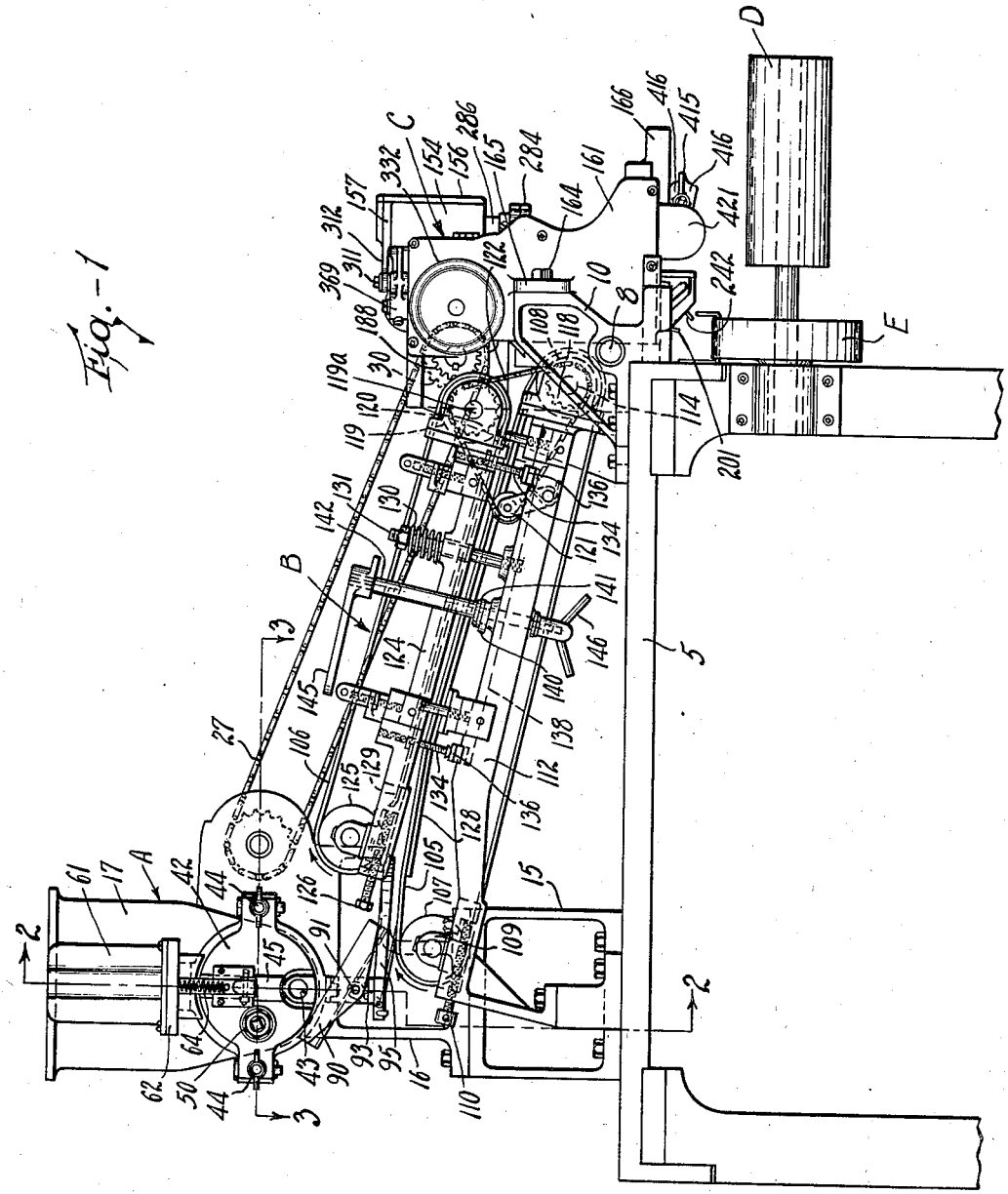
Fig. 1 is a side elevation of a complete machine by which the dough is worked or kneaded and from which accurately measured lumps or "gobs" of dough are delivered to the rolling belts which form the "gobs" into sticks of uniform diameter and length. At the right side of this view is the tying head or unit.

Referring to Fig. 1, the complete unit comprises a dough working and lump forming portion or unit, designated generally by the letter A, and an intermediate rolling table, designated at B, which receives the measured lumps of dough and forms them into the sticks and delivers the rolled sticks to a pretzel-forimng or tying head C. The completely tied pretzels are delivered on the conveyor belt D and the scrap dough from the cutters which cut the stick to accurate length is received on the waste conveyor belt E.

The main elements A, B and C are mounted upon a bed plate 5 and are driven from a source of power by belts 6—6 engaging a pulley 7 (Fig. 6) on the main drive shaft 8. The shaft 8 is journaled in a bracket or housing 9 at the right hand end of the machine as viewed in Fig. 6 and in a second bracket 10 on the left hand side of the machine. All of the moving elements of this machine are driven from this main drive shaft.

Dough Lump Measuring and Forming

On the rear of the bed plate 5 is located a pedestal 15 to the upper end of which is secured a casting 16, the upper portion of which is formed as a hopper 17 from one side of which extends the barrel 18 in which is located the dough mixing and feeding worm 19 which forces the dough from the hopper toward the discharge end of the barrel. It will be noted that the pitch of the worm is reduced toward its discharge end so that the dough is compacted at the discharge point. The opposite end of the worm projects through the casting and is provided with a gear 20 meshing with pinion 21 fixed to intermediate gear 22 which, in turn, is driven by a pinion 24 on the countershaft 25. To this shaft is secured the sprocket pinion 26 which is driven by the chain 27.

The chain 27 extends toward the head of the machine and is trained over a sprocket 30 on the shaft 31 (Fig. 11) which carries a sprocket 32 connected by the chain 34 with the sprocket 35 on the main drive shaft 8 (Fig. 10).

As the dough is moved forwardly by the worm 19, it is compacted against a plate or baffle 38 located at the discharge end of the barrel and provided with a centrally located port 39. This baffle 38 is not the outer wall of the extruding machine, but is spaced therefrom to provide a pressure chamber 40, the opposite wall of which is formed by a flanged cap 42 in which the discharge port 43 is located. This cap is clamped on the outside of the extruding machine by the swinging screw-threaded clamps 44 which hold the cap and plate 38 in position, but permit removal for cleaning. A knife 45, to be described in detail, moves over the outer surface of the cap and cuts off the individual lumps of dough at the proper timed intervals, one of said lumps being shown in dotted lines in Fig. 2.

The objection to prior dough-lump forming machines has been irregularity of operation, it having been impossible heretofore to secure strictly uniform lumps of dough. The successful operation of the entire machine is dependent in a large measure upon the regular delivery to the pretzel-forming machine of uniform sticks of dough and the uniformity in sticks depends upon the accuracy of the lump-forming means. In former lump-forming and cutting means the dough has tended to be discharged from the forcing machine head irregularly and in spurts or pulsations. This has resulted in the formation of non-uniform lumps.

This arrangement shown herein has overcome that difficulty and in its operation delivers a steady stream of uniform size and weight. It will be observed that the discharge opening 43 is not in alignment with the opening 39 in the baffle 38 and that the chamber 40 operates as a sort of accumulator or pressure chamber in which the dough is compacted by the force of the feed screw. This intermediate or antechamber in the head of the dough-extruding machine eleminates all of the pulsations and irregularities in the dough movement and maintains a uniform pressure back of the discharge opening 43, so that the stream of dough as it issues therefrom is constant in speed and volume. As the knife 45 is operated at exact timed intervals, each gob or lump is exactly like every other gob and consequently the sticks delivered to the tying unit are identical in weight, length and diameter.

In order to vary the size of the gob, an adjustable gate 48 is located between the plate 38 and the cap 42 being fixed to a pin 49 rotatable in the plate and held in position by the nut 50 and washer 51. The amount of dough which passes into the pressure chamber 40, and consequently the size of the lumps for fixed cutting intervals, is determined by the area of the opening 39 which is exposed by the gate 48. This determines the length of a pretzel stick of a given diameter.

The means for operating the knife 45 will now be described. This knife moves over and against the face of the cap 42 and is pivoted at 55 to a knife slide 56 guided for vertical movement on the cap. The knife is formed with an angular extension shown in Fig. 2 and a coil spring 58 is seated in the face of the knife slide and presses the cutting edge of the knife against the face of the cap so as to make a clean cut across the discharge opening 43.

The knife is actuated to make a quick cutting stroke and return by a solenoid 60 mounted in a solenoid housing 61 secured to a bracket 62 mounted on the casting 18. The slide 56 has an extension which passes into the solenoid and is provided with a pin 63 connected by the coil spring 64 with the housing. When the solenoid is energized, the slide 56 is moved downwardly, passing the knife over the discharge opening 43 and is immediately returned by the spring.

The solenoid is momentarily energized by a switch contained in a box 66, the actuating pin 67 of which is yieldingly pressed upwardly against the horizontal arm of a pivoted lever 68, the other end of which bears against a timer disk 70. This disk 70 (Figs. 11 and 17) is formed on the inner end of a sleeve 71 which is keyed to but slidable in the hub 72 of a gear 74 mounted in the housing 9. The disk 70 is spring pressed to the left in Fig. 11 by a coil spring 75 located in a bore in the sleeve 71 and bearing at its outer end against the housing, the inward movement of the sleeve being fixed by the lock nut 76 threaded on the end of the sleeve.

The gear 74 is in mesh with the gear 73 which is fixed on the end of the shaft 69 located in the housing and provided at its outer end with an operating knob 77. As shown, this knob is knurled for part of its surface and is screw-threaded on the end of the shaft 74, a lock nut 77a holding the parts together. By rotation of the knob 77 the gear 74 will be turned which will turn the disk 70. A spring pressed pin 78 located in the knob bears against the face of the housing to prevent too free movement of the knob.

The purpose of the adjustment of the gear 74 and disk 70 is to provide means for bringing the gob cutting mechanism into proper timed relation to the transfer device which moves the stick into the tying unit, for if the stick is not delivered at the moment the transfer device makes its stroke, the tying mechanism will make an idle movement or two sticks may be delivered at one time.

The disk 70 is moved to the right of Fig. 11 once during each complete cycle of the tying mechanism and thus actuates the lever 68 and through its associated elements moves the knife 45 by the following means.

On the outer face of the disk 70 is a cam surface 80 which is in the path of a lug 81 mounted on a nut 82 which is screw-threaded on the end of a driving sleeve 86 mounted upon the main cam drum operating shaft 260 which actuates the pretzel tying mechanism as will be described under that heading. Supplemental lock nut 83 and washer 84 are located on the end of the driving sleeve 86.

There is a fixed interval between the cutting of a gob and the time that it is delivered in stick form to the transfer mechanism which, in turn, delivers the stick to the tying unit, and the adjustment of the knob 77 which determines the moment of contact of the parts 80 and 81 and thereby the operation of the knife 45 will afford means for bringing these operations in proper stepped relation. The adjustment can be made while the machine is running. If the proper and timed delivery is not made, the operator can bring the two mechanisms into proper relation by turning the knob 77 in either direction to the required extent without stopping or interfering with the operation of the machine.

It is very important to the economical and efficient operation of the entire pretzel making unit that the dough lump cutting means operate at the exact instant which will insure that the stick is rolled and delivered to the tying unit when the transfer mechanism is in position to receive it. If the various instrumentalities of the complete operative combination do not work in absolute timed relation, or if some variable is accidentally introduced in the operations, the dough sticks will get out of place and require stoppage of the machine for cleaning. It is also important that the machine be provided with means by which the cutting operation is capable of being restored to correct timed relation with the other operations while the machine is running, otherwise the machine will have to be shut down for this purpose and its production reduced. The operator can secure a quicker and more accurate adjustment of the parts if he can make the required adjustment while the machine is running. These objects are secured by the novel combination of elements illustrated and described herein.

The gob of dough cut off by the knife 45 falls into a delivery trough 90 secured to a shaft 91 pivoted in a bracket 92 carried on an arm 93 extending from the under side of the casting 17. Mounted on pivots 87 below the arm 93 are two guiding rails 95 which are pivotally adjustable so as to direct the gob to the exact center line of the lower rolling belt. To adjust the rails, set screws 88 are threaded in lugs 88a and bear against the rear ends of the rails, a light coil spring 89 holding the rails against the set screws.

It is advisable to have means by which the gob of dough may at times be diverted from the rolling belts, and for this purpose the trough can be thrown backwardly so that the gobs fall behind the rolling belts. To do this, the shaft 91 is fixed to a coil spring 96 which is, in turn, fixed to a rotating operating rod 97, the far end of which is located in a recess in the frame. An arm 98 is secured to the rod and connected to a second rod 99 which extends to the front of the machine, being guided in a tube 99a secured to the frame. At the front of the machine the rod 99 is secured to a knob 100 (see Fig. 6) in the front wall of the housing 9.

If some mishap should occur at the rolling belts, the operator can pull the knob 100 which will reverse the trough and no more gobs of dough will drop on the belt until the trough is restored to its normal position.

DOUGH STICK ROLLING UNIT

This unit, designate as B, consists of two endless, horizontal belts which receive the gob of dough as delivered by the trough 90 and guided by the rails 95 and reduce the spherical gob into the long stick. The table is generally inclined downwardly from the unit A to the unit C.

It consists of a lower belt 105 and an upper belt 106, the lower belt being extended at the upper end to receive the gob of dough and at the lower end to deliver the rolled stick to the transfer wheel or pick-up bar which is the first element of the tying mechanism.

The lower belt 105 passes over an idler pulley 107 at its upper end and a driven pulley 108 at its discharge end. The shaft of the pulley 107 is mounted in adjustable bearing blocks 109 which are moved by threaded bolts 110 mounted in the lower belt frame 112. The shaft 114 of the pulley 108 is extended on the right hand side of the machine where it is fixed to a pinion 115 which meshes with a driving gear 116 on the main driving shaft 8 (Fig. 10), so that the rolling belts are actuated in timed relation to the other units. The other end of the shaft 114 carries a sprocket 118 and the shaft 119a of the upper belt pulley 119 carries a sprocket 120. Over these sprockets and an idler sprocket 121, which is spring pressed to tighten the chain, is trained the chain 122 by which both belts are driven, it being noted that the facing surfaces of the two belts move in opposite directions to roll the stick of dough, but that, owing to the different diameters of the sprockets 118 and 120, the surface speed of the upper belt is somewhat less than the surface speed of the lower belt, and as the upper face of the lower belt moves toward the tying unit, the stick is propelled forwardly while it is being rolled.

The upper belt 106 is carried by the frame 124 and passes over the pulley 125 which is also adjustable for belt tightening purposes by the bolts 126. In their opposing areas, the belt 105 is backed by a plate 128 and the belt 106 by a plate 129, each held in its respective frame. The belts are yieldingly held by springs 130 surrounding posts 131 rising from the frame 112 and bearing on the top of frame 124.

In order to make sticks of varying diameters, it is desirable to adjust the plate 129 relative to the plate 128, and the means for quickly and accurately accomplishing this purpose is one of the features of the invention. The frame 124 is supported by four adjustable screw-threaded pins 134, the heads of which are rounded and bear upon wedge blocks 135 arranged in pairs upon two transverse bars 136 which are slidable laterally in grooves in the frame 112. The two bars 136 are connected to form an H-shaped elevating and lowering frame by a cross member 138 to which is connected a link 140. The link 140 is extended to one side of the frame and is received over an eccentric portion 141 of a vertical operating shaft 142 rotatable in the frame 112. The upper end of the shaft 142 is provided with an arm 145 by which it may be turned and the lower end is screw-threaded to receive a locking wing nut 146 by which it may be held in adjusted position. The plate 129 is moved toward and from the fixed plate 128 by actuation of the lever 145 and the four cornered positioning of the sliding wedge blocks and their cooperating supporting pins 134 assures exact parallel movement of the two pressure plates upon the actuation of the single lever In other respects the rolling table is of the usual or standard form and is crowned in the center as is the standard practice and no further description is necessary.

It will be observed that as the successive gobs of dough drop onto the lower belt, they are carried between the two belts and rolled into stick form to accurate diameters and in that form are delivered to the pretzel tying head. The diameter of the sticks is determined by the adjustment of the two belts moving in parallelism, as has been described, so that each stick is of uniform diameter throughout. The dough delivery head is adjusted so that each gob contains the exact quantity of dough to make a stick of the required length and diameter.

PRETZEL TYING

The pretzel tying head comprises the left hand frame 152 and the right hand frame 153 (facing the machine as in Fig. 6) and a cross head or housing 154, the latter being provided with a removable front plate 156 and a removable top plate 157, which elements support the various operating parts of the tying unit. On the top of the frame 152 is a cap plate 158 and on the top of the frame 153 is a cap plate 160. On the left of the frame 152 is a secondary housing 161 in which certain of the moving elements are located. The entire head is attached to the housing 9 by a bolt 162 passing through a lug 163 on the frame 153 and to the housing 10 by a bolt 164 passing through a lug 165 on the housing 161. Across the lower part of the frames 152 and 153 is located the bottom plate 166 on which the tying operation is performed.

(a) *Stick delivery*

The dough stick, which is indicated at S, is delivered by the lower belt 105 to the first element of the stick delivery mechanism which is a pickup bar or transfer device indicated by the numeral 170. This is a rotatable bar extending across the belt and having two deep, oppositely located pockets. As shown more clearly in Fig. 15, the bottom, central portion of each pocket is arched or raised, as at 171, so that the center portion of the stick precedes the ends as it rolls out of the pocket. This is to prevent any tendency of the stick to bend or be distorted due to the fact that the ends of the stick will roll faster than the center when the transfer bar discharges the stick to the next indexing element.

The ends of the pick-up bar are provided with reduced shaft extensions which are rotatably mounted in the frames 152 and 153 and on the right hand shaft extension is fixed the two-toothed ratchet 173 (Figs. 7 and 12) with which is associated the pawl 175 secured to an oscillating gear 176 movable on the shaft. This gear is oscillated through 180° so as to turn the pick-up bar to permit the stick in one pocket to roll out and toward the tying head, the other pocket being then in position to receive the next stick. To oscillate the gear 176, a sector gear 177 is pivoted at 178 in the frame and provided at its upper end with a pin 179 extending across the rear of the frame 153, the pin being grooved at its end to receive the fork of a lever 180 pivoted to the frame at 181. The lever 180 lies at the side of a cam 183 which is keyed to the driving sleeve 86, heretofore identified (Figs. 11 and 12), and carries a roller 185 which tracks in the groove 186 on the cam 183.

The sleeve 86, which also carries the timing nut 82, as has been described, is frictionally driven by a gear 188 on the end of the shaft 31 and meshing with a gear 189, the center of which is spaced from the sleeve by a bushing 189ᵃ. The driving force is transmitted from the gear 189 to the sleeve 86 by the two fibre washers 190 on opposite sides of the gear which are held under pressure between the nut 82 and the cam 183. This method of driving the machine affords a safety device in the event the tying mechanism is jammed for any reason.

In order that the transfer device will be certain to come to rest with its pocket in line with the top surface of the belt 105, its left hand shaft extension carries a two-toothed disk 192 which is adapted to be engaged by a spring-actuated detent 193 pivoted on the inside of the frame 152, as shown in dotted lines in Fig. 8.

In the operation of the machine, it may be desirable to divert a pretzel stick just before it reaches the tying position, as, for example, in the event the tying arms fail to seize the end of the previously delivered stick properly. The operator is afforded means by which the oncoming stick can be discharged from the machine to avoid the entangling of a fresh stick with the one already at the tying position. For this purpose there is provided a pivoted plate or trap 195 just in front of the transfer device which is supported on levers 196 pivoted in the frames 152 and 153. An operating trigger 197 is carried on one of these plates, here shown at the right, which, when depressed, will raise the plate to the dotted line position shown in Fig. 7. The rear end of the trigger is formed with a sector-shaped extension 199 having two notches, one of which is engaged in either position by a spring-actuated detent 200 mounted on the frame 153. Depending from the under side of the trap is a light sheet metal board 201 which will direct the diverted pretzel sticks to the waste conveyor E.

When the machine is operating, the pretzel sticks roll over the trap 195 and into the indexing star wheel 205 which delivers each stick in proper timed relation to the position where the ends of the stick are picked up by the gripper fingers for the tying operation. The star wheel is provided with four pockets and is turned 90° with each operation of the machine so as to place a stick on the base plate 166 with its ends lying in grooves 206 at either side of the form plate 391, to be described, about which the pretzel is wrapped.

On the right hand end of the star wheel is fixed an indexing roller 208 having four recesses with which is adapted to cooperate a spring pressed dog 209 pivoted on the inside of the frame 153 so that the star wheel is held when at rest in position to receive and deliver each stick.

The left hand end of the star wheel terminates in the frame 152 where it is provided with a four-toothed ratchet 210 (Figs. 8 and 19). In alignment with the star wheel is the pawl carrying disk 212 formed as a part of the short shaft 213 journalled in the housing 161. On this disk is located the pawl 215 which engages the ratchet and turns the star wheel. The end of the shaft 213 projects into the housing 161 where it is fixed to a segmental gear 216 (Fig. 9). This gear is in mesh with a horizontal reciprocating rack 218 movable in guideways in the housing 161. The end of the rack carries a roller 219 which is engaged by an angular cam track 203 on a vertically movable sliding cam plate 204 also mounted in the housing.

When the pretzel stick is lying on the bottom plate 166, its ends overhang the raised central portion of the plate and rest upon U-shaped knife blocks 220. The inner arm 220$^a$ of each block is a support for the end of the stick and may be raised slightly, as shown in Fig. 19, to secure a more positive gripping action. The outer arm 220$^b$ of each block is sharpened to form the stationary blade of a shear-like cutter. The sticks are formed slightly longer than is required and the knives cut the sticks to definite lengths so that the portion of the stick which is to form the pretzel is not only of the required length, but so that the entire stick is accurately centered in the machine.

With each stationary knife blade 220$^b$ is associated the moving knife blade 221 which is adjustably secured on the upper side of a knife-holding plate 222 secured to a short horizontal shaft 223 rotatable in a plate 224 secured to the bottom plate 166.

Each shaft 223 carries at its extremity an arm 225 which is connected by the link 226 with a pivoted rocking plate 227 (Fig. 20). The plates 227 are mounted on a shaft 229 which extends across the machine and are secured together for joint movement by a tie-rod 230. At the left hand side of the machine the plate 227 has on its opposite side a short connecting link 232 which is pivoted to a rocking arm 233 fixed to a shaft 235. This shaft 235 extends through the frame 152 and into the housing 161 where it is provided with a fixed pinion 237 engaged by a horizontal reciprocating rack 238 moving in guideways in the housing (Fig. 9). The rack 238 is provided with a roller 240 which engages with the cam track 241 in the vertical cam plate 204.

It will be observed that as the cam plate is moved up and down in the housing, the star wheel and the knife are operated at the proper intervals, the knife being raised when the star wheel is delivering a stick to its position on the bottom plate. After the stick is in position, the knife blade descends and cuts off the end of the stick and the severed portions of the stick drop onto the inclined plate 242 and thence onto the waste belt E. It will also be noted that by an extension of the cam slot 203, the cam plate 204 operates the form plate located in the bottom plate, on which the pretzel is tied, to dump the finished pretzel.

The cam plate 204 is moved in the vertical guideway 245 by means of a link 246 pivoted to the upper end of the cam plate and to a lever 247 which is pivotally mounted on the housing 161 at 248. A second link 249 is connected to a lever 250 which is pivotally mounted at 251 in the top of the housing and is provided with a roller 252 engaging a cam track 253 on the rotating cam 254 fixed on the end of the main cam drum operating shaft 260.

(b) The tying arms

The tying arms are substantially the same as shown in the Curtis patent heretofore referred to, and their paths of movement correspond to the paths taken by the arms shown in that patent, and the description herein given will, therefore, be directed primarily to the different means employed for actuating these arms. For a full and detailed description of the elements and operations which are similar, reference is made to that patent.

There are provided two grippers 265R and 265L on the right and left sides of the machine, which are mounted on arms 266 and 267, respectively, these arms being carried by primary rocking arms so that the grippers are moved in the manner prescribed by the Curtis patent, the arm 266 being bent as shown in the drawings (Figs. 10 and 15) to permit the tying operation.

Each gripper consists of a rear fixed leaf or finger 268 which is rigid with its supporting arm from which extend wings 269 on which are pivoted wings 270 from the movable leaf 272 of the gripper unit. A coil spring 274 located between the upper ends of the leaves tends to force the lower ends together about the pretzel stick. A spring latch 275 pivoted on the leaf 272 will hold the two leaves spread apart until the grippers in their downward movement reach the point where they are ready to seize the stick (Fig. 7$^a$). At this point the end of the latch, which projects through the stationary leaf or finger 268, will strike the star wheel 205 which will raise the latch and permit the movable leaf to close on the pretzel stick (Fig. 7). As shown in Fig. 19, the lower end of each leaf is offset and bifurcated so that the prongs extend on either side of the wing 220$^a$ of the cutting block, thereby securely and certainly seizing upon the end of the pretzel stick.

Each pretzel-tying arm has a swinging movement and rotary movement to accomplish the tying of the pretzel. As this portion of the mechanism is the same for each arm, a description of the operating mechanism for both arms will be given, like reference numerals, when possible, being applied to like portions of the machine. Referring particularly to Figs. 6, 13, 14 and 16, it will be seen that each arm is secured to a block or holder 278 secured to the lower end of a shaft 279 fixed to a gear 280. This gear is meshed with an idler 281 meshing, in turn, with a drive gear 282. These gears 280, 281 and 282 are mounted in a swinging primary arm or housing 284 secured by a split clamping collar 285 to the lower end of a tubular shaft 286 which is rotatably and slidably mounted in the lower side of the housing 154. This tubular shaft is employed to swing and also to raise and lower the housing and for this purpose on its upper end is fixed the grooved collar 288 engaged by the forked end of a bell-crank lever 290. The means for operating the bell-crank levers will be described with the description for the means for imparting the other movements to the tying arms and to the tampers which press the ends of the sticks to the body of the pretzel.

In order to swing the housings 284 during the tying operation, the vertical shafts 286 are splined to segmental gears 295 held in position by a web 296 formed as a part of the housing. These gears swing the housings outwardly at the start of the tying movement to the position indicated by dotted lines in Fig. 14, where they remain during the completion of the tying operation, which is done by the swinging of the arms thereon, and at the end of the tying operation the housings are returned to the starting position shown in the full lines. The splining of the gears 295 permits the raising and lowering of the housings. The gears 295 are actuated simultaneously by two sliding racks 297, one of which is shown in detail in Fig. 16ª, movable over the inside base of the housing 154, being held in place by the front plate 156. At the far end of each rack is a pin 299 engaged by the forked lower end of a lever 300, the upper end of which is pivoted at 301 in a bearing formed on the under side of the top plate 157. Midway of each lever 300 is pivoted a link 303, the inner ends of the said links being pivotally connected to a rocker arm 304 journaled in the housing.

In order to rotate the arms 266 and 267 in their bearings in the outer end of each housing through the gears 280, 281 and 282, the gear 282 is slidably mounted upon an operating shaft so as to permit the raising and lowering of the housing. In the form shown (Fig. 14), the gear 282 is provided with a hexagonal center having a sliding fit with a vertical shaft 306, the lower end of which is reduced to the hexagonal cross section. The upper and main portion of the shaft 306 is slidably mounted in the tubular shaft 286, but extends beyond the collar 288 and into bearings, one formed in the web 307 of the housing 154 and the other in the top plate 157.

Above the web 307 and fixed to each shaft 306 is a gear 309 (Fig. 13), each of which is in mesh with a gear sector 310 which projects through an opening in the rear wall of the housing and is pivoted at 311 on the under side of an extension 312 on the top plate.

(c) The tampers

After each end of the pretzel stick is brought to its position over the main body of the stick, the end of the stick is pressed against the body of the stick by a tamping foot. The two tamping feet, one for each end of the stick, are moved downwardly and returned at different times to coincide with the completion of the tying movement for each end of the stick, but as their construction is the same, a single description will suffice for both.

A tamper is indicated at 315 and consists of a flat bar formed at its lower end with a foot 316 shaped as shown in Fig. 16 and having flaring wings. As will be understood from the Curtis patent referred to, these tamper feet in their downward or tamping movement pass between the gripping extensions of the stick-gripping fingers 265 and spread the grippers to release the stick, the position of a tamper foot being shown in dotted lines in Fig. 7ª.

Each tamper 315 is slotted at the point where it is attached to the lower end of a vertically slidable bar 318 for the purpose of adjusting the lower limit of movement of the tamper foot to accommodate different thicknesses of pretzel sticks. The bar 318 is movable in a guideway 320 attached to the rear of the housing. The means for raising and lowering a tamper is shown in Fig. 13ª. In the upper end of each bar 318 is located a pin 321 engaged by the forked end of a lever 322 pivoted at 323 on the rear wall of the housing. The lever 322 is provided with an operating extension 324.

(d) The cam drum

All of the elements which have been described in connection with the tying mechanism and tamping feet are operated by a single cam drum which is indicated by the numeral 330. By this means the multiplicity of cams and levers which characterized the Curtis machine are avoided. This results in a smoother and a more accurate operation, and reduces breakdowns and delays occasioned by the means formerly used for actuating the pretzel-tying arms. The speed of the machine could be greatly increased if found desirable.

The cam drum is a large cylinder located in the rear of the housing and is provided with a plurality of grooves which will be described in connection with each of the parts which it operates. It is keyed upon the main cam drum shaft 260 previously referred to, the right hand end of which is rotatably mounted in the driving sleeve 86 previously described and shown in Fig. 11, while the left hand end is rotatably mounted in the left hand end plate 152 and extends through the housing 161 and it carries the hand wheel 332 by which the drum can be rotated by hand if desired.

Referring to Figs. 7, 11 and 13, the left hand end of the driving sleeve 86 is provided with a keyway 333 along which is slidable the clutch 335 having the groove engaged by a shoe 336 carried by an arm 337 fixed on the end of a short shaft 338 pivotally mounted in and extending through the arm 339 by which the housing is attached to the end frame 152. At the front the shaft 338 is provided with an operating handle 340 by which the clutch is moved into and out of driving relation to the cam drum, a spring detent 341 holding the arm in its two extreme positions. The side of the clutch 335 adjacent the drum is formed with a wedge-shaped tooth 342, the flat face of which engages the flat face of a pivoted spring-held dog 344 mounted on a disk 345 fixed on the shaft 260 by the set screws 343. By adjusting the position of the disk 345 about the shaft 260 the timing of the tying arms can be adjusted. On the dog 344 is located a tooth 346 adapted to engage a ratchet wheel 348 which is for the purpose of driving a counter located in the cap plate 160. The dog is pressed inwardly by a leaf spring 350 so that when the drum is rotated, through the hand wheel 332, the counter wheel will not be actuated, but when the machine is being run through the clutch, the dog is forced outwardly so that the tooth engages the counter. This prevents the operation of the counter when the machine is not producing.

Referring now to the several cam grooves on the drum 330 and beginning at the right next to the clutch, the first groove 355 is for raising and lowering the right hand tying arm and for this purpose is provided with the necessary sinuosities which raise the entire unit to follow the path as described in the Curtis patent, it being unnecessary to follow the exact procedure shown and described therein. A roller 356 is located in the groove 355 being carried on the end of the pivoted arm 357 on the back of the housing. This arm is attached to a shaft 358 and to this shaft on the inside of the housing is attached a second arm 359 which is connected by a link 360 with the bell crank lever 290, previously described, which raises and lowers the pretzel-tying arm and the housing 284.

The second cam groove 365 is for raising and lowering the right hand tamper 315. In this groove is received the roller 366 on the arm 324.

The third groove 368 is for the purpose of swinging the arm 266 in its bearings on the housing 284 and is appropriately shaped to give the requisite movements as prescribed by the Curtis procedure. Each of the sectors 319 is provided with a tail piece 369, the end of which is enlarged and provided with a slot 370 in which is adjustably fixed a pin 371 extending downwardly toward the drum and carrying at its lower end a roller 372 which engages the groove 368. The adjustment of the roller in the sector arm affords means for accurately adjusting the throw of the arm 266 as it is swung about its independent pivot.

The center cam groove 375 is for the purpose of actuating the means for swinging the housings 284 through the tubular shafts 286. For this purpose the member 304 is fixed to a shaft 376 which extends through the housing and is provided on its rear end with a lever 377 provided with a roller 378 which rides in the groove 375.

The next groove 380 is similar to the groove 368 and swings the arm 267, and as the operating connections are similar, they will not be described in detail. The next groove 381 is for the left hand tamper and the last groove 382 operates the elevating mechanism for the left hand tying arm, and as these parts are similar to those described, no further details need be given thereon.

(e) *Pretzel-tying form plate and dumping mechanism*

Centrally located in the base plate 166 is an irregularly shaped opening 390 in which is rotatably mounted the pretzel-tying form plate indicated generally by the numeral 391. The pretzel stick S (Fig. 15) lies on the top of the plate, its central portion spanning the rear of the form plate. Two projections 394 on either side of the center project from the plate 166 beneath the stick and are provided with two inclined pins 395 which assist in holding the pretzel stick during the tying operation. These projections 394 also lie beneath the tampers and afford a foundation against which the tamping operation is performed.

The form plate is turned 180° to dump the finished pretzel and for this purpose its two sides are duplicates so that each pretzel is wrapped and tied about similar forms. On the sides of the plates are wings 396, each provided with a pin 398 which will be located between the pins 395 and assure that the pretzel is stripped from the pins 395 when the form plate is rotated. At the center of the form plate are located the arc-shaped segments 399 which define the two loops of the pretzels.

The form plate 391 is secured to a horizontal shaft 400 which extends the length of the plate 166, being rotatable in the frames 152 and 153 and in the raised, central portion of the plate 166 adjacent the form plate. At the right hand end of the shaft is fixed a disk 401 (Fig. 7) provided with two notches engaged by a spring pressed pawl 402 mounted on the right hand frame 153 so as to insure that the form plate comes to rest in position level with the base plate 166. The opposite end of the shaft 400 extends into the housing 161 where it carries the fixed two-toothed ratchet 404 (Fig. 9). Engaging this ratchet is a pawl 405 which is carried on the sector gear 406. This gear is in mesh with the sliding rack 408, the rear end of which is provided with a roller 409 engaging the extension of the cam 203 previously described. The construction is such that the form plate is rotated 180° at the conclusion of each pretzel tying operation and dumps the completed pretzel through the opening 390, at the same time bringing the opposite side of the form plate in position for the next tying operation.

In the event an end of the pretzel stick is missed by the fingers, the base plate 166 is provided with the chutes 410 which lead to the opening 390 down which the mutilated stick may escape.

The completed pretzel is delivered by the form plate to a rotating transfer plate or grid, indicated by the numeral 415, which is directly under the opening 390 and over the belt D. Rotating through 180° this plate deposits the pretzel on the belt. The two sides of the transfer plate are alike and provided with formations 416 to locate the pretzel.

The transfer plate is fixed to a transverse shaft 418 located in bearings depending from the bed plate 166. This shaft is connected by the shaft 419 with a shaft 420 supported in a housing 421 formed on the frame plate 152. This shaft, and thus the transfer plate, is rotated 180° through the two-toothed ratchet 422 (Fig. 8) operated by the pawl 424 on the gear sector 425. At the opposite side of the transfer plate there is secured to the shaft 418 a two-notched disk 423 engaged by the spring pawl 427 on the base plate (Fig. 10) which insures the correct horizontal position of the transfer plate. A double gear 426 is in mesh with the gear 425 and is rocked to the requisite degree to turn the transfer plate by a reciprocating rack 428 movable in the frame 152. The end of the rack is provided with a pin 429 engaged by the forked lower end of a lever 430 pivoted in the frame at 431 and provided at its upper end with a roller 432 engaging the cam track 433 of the rotating cam 434. The shaft of the cam 434 extends through the frame 152 and carries a gear 435 which is in mesh with and driven by a gear 436 fixed to the cam drum shaft 260 adjacent to the frame 152.

OPERATION

The operation of the machine is wholly automatic and requires only that the hopper 17 be supplied with sufficient dough to maintain a continuous movement of the dough sticks to the pickup bar 170 to assure an uninterrupted delivery of completed pretzels to the off-bearing belt D which conveys the pretzels to the oven. Except for supervision to be assured that the several elements of the machine are operating in proper timed relation, no labor is required. The machine is capable of making perfect pretzels at a much higher rate per minute than the Curtis machine, the only practical limitation on the speed of the machine being the speed at which the dough can be formed and the rate at which the pretzels can be handled in the cooking ovens. The reduction of maintenance costs and the increased efficiency of the machine, due to less frequent stoppage for repairs or readjustments, is one of the advantages over the older machine. The fact that the dough stick delivery mechanism is combined with the pretzel-forming head and that these two elements can be brought into step without interrupting the operation of either element is a decided advantage. The adjustment of the rolling belts as described gives a uniform stick of varying diameters and this can also be done while the balance of the machine is in operation.

The lumps or gobs of dough as they are cut off by the knife 45 fall on the lower belt which carries them forward between the belts and the uniform sticks are delivered to the transfer wheel 170 and thence through the star wheel 205 to the table. Here the stick is cut to exact length and the ends are picked up and tied together to form the completed pretzel. The single rotary cam drum actuates the arms and the tampers at the exact time required and the finished pretzel is delivered by the rotating form plate 391 and the transfer plate 415 and thence to the belt D.

The other elements of the machine have been fully described.

What is claimed is:

1. In a pretzel making machine, a tying unit and means for delivering a stick to the tying unit comprising a rotating transfer wheel having a groove to receive and hold the stick, said groove being arched at its central portion.

2. In a pretzel making machine, a tying unit comprising an arm, a gripper for the end of a pretzel stick on the arm, means for swinging the arm bodily and for rotating it upon its axis comprising a swinging housing and a gear train therein to one gear of which the arm is attached, and means for driving the gear train.

3. In a pretzel making machine, a tying unit comprising an arm, a gripper for the end of a pretzel stick on the arm, means for swinging the arm bodily and for rotating it upon its axis comprising a swinging housing and a gear train therein to one gear of which the arm is attached, means for driving the gear train, and means to swing the housing operable independently of the gear train.

4. In a pretzel making machine, a tying unit comprising a tubular shaft, a housing fixed to the end of the shaft, a gear at the end of the shaft in the housing, a rotatable arm on the end of the housing, a driving connection between the gear and the arm, and means to drive the gear independently of the shaft.

5. In a pretzel making machine, a tying unit comprising a tubular shaft, a second shaft rotatable in the tubular shaft, a housing fixed to one end of the tubular shaft, a gear located in the housing and splined on the second shaft, a rotatable tying arm on the housing, driving connections between the gear and the tying arm, means for raising and lowering the tubular shaft, and means for rotating the tubular shaft in raised or lowered position.

6. In a pretzel making machine, a tying unit comprising a tubular shaft, a second shaft rotatable in the tubular shaft, a housing fixed to one end of the tubular shaft, a gear located in the housing and splined on the second shaft, a rotatable tying arm on the housing, driving connections between the gear and the tying arm, means for raising and lowering the tubular shaft, and means for rotating the tubular shaft and the second shaft independently.

7. In a pretzel making machine, a single rotatable cam drum, pretzel tying means comprising a swinging primary arm and a secondary arm pivoted on the end of the primary arm, and means cooperating with the cam drum for actuating both said arms.

8. In a pretzel making machine, a single rotatable cam drum, pretzel tying means comprising a pair of swinging primary arms, a secondary arm pivoted on the end of each primary arm, and means cooperating with the cam drum for actuating all of said arms.

9. In a pretzel making machine, a single rotatable cam drum having a plurality of cam formations on its periphery and pretzel tying means comprising a pair of swinging primary arms, a secondary arm pivoted on the end of each primary arm, and elevating means for the primary arms, and means cooperating with said cam formations for actuating all of said elements of the pretzel tying means.

10. In a pretzel making machine, a single rotatable cam drum having a plurality of cam formations on its periphery and pretzel tying means comprising a pair of swinging primary arms, a secondary arm pivoted on the end of each primary arm, elevating means for the primary arms and a pair of tampers, and means cooperating with said cam formations for actuating all of said elements of the pretzel tying means.

11. A pretzel making machine comprising a frame, a pretzel forming plate on the frame, a housing on the frame over the forming plate, a single rotatable cam drum extending along the housing, pretzel tying mechanism comprising a pair of primary swinging arms and a secondary arm pivoted at the end of each primary arm, and means for actuating the elements of the pretzel tying mechanism located in the housing and cooperating with the cam drum.

12. A pretzel making machine comprising a frame, a pretzel forming plate on the frame, a housing on the frame over the forming plate, a single rotatable cam drum extending along the housing, pretzel tying mechanism comprising a pair of primary swinging arms and a secondary arm pivoted at the end of each primary arm, and means for actuating the elements of the pretzel tying mechanism and for raising and lowering the primary arms located in the housing and cooperating with the cam drum.

13. A pretzel making machine comprising a frame, a pretzel forming plate on the frame, a housing on the frame over the forming plate, a single rotatable cam drum extending along the housing, pretzel tying mechanism comprising a pair of primary swinging arms and a secondary arm pivoted at the end of each primary arm and a pair of tampers, and means for actuating the elements of the pretzel tying mechanism and for raising and lowering the primary arms located in the housing and cooperating with the cam drum.

14. A pretzel making machine comprising means for delivering a dough stick, a pair of primary swinging arms, a secondary swinging arm on the end of each primary arm, a stick gripper on the end of each secondary arm, a single cam for actuating all of said arms in timed relation to convert the dough stick to pretzel form, and adjustable means to synchronize the dough stick delivery and the cam.

15. A pretzel making machine comprising means for delivering a dough stick, a pair of primary swinging arms, a secondary swinging arm on the end of each primary arm, a stick gripper on the end of each secondary arm, a single cam for actuating all of said arms in timed relation to convert the dough stick to pretzel form, and manually adjustable means operable without stopping either the cam or the dough stick delivery means to bring said elements into synchronism.

16. In a pretzel tying machine, a single cylindrical cam drum, cam formations on the periphery of the drum, a pair of primary arms, secondary arms on the primary arms, means for swinging the primary arms, means for swinging the secondary arms independently of one another, and means for raising and lowering the primary arms at different times, all actuated by the said cam.

17. In a pretzel tying machine, a single cylindrical cam drum, cam formations on the periphery of the drum, a pair of primary arms, secondary arms on the primary arms, means for jointly swinging the primary arms, means for swinging the secondary arms independently of one another, and means for raising and lowering the primary arms at different times, all actuated by the said cam.

18. In a pretzel tying machine, a single cylindrical cam drum, cam formations on the periphery of the drum, a pair of primary arms, secondary arms on the primary arms, means for swinging the primary arms, means for swinging the secondary arms independently of one another, means for raising and lowering the primary arms at different times, and a pair of tampers movable independently of each other, all actuated by the said cam.

19. A machine for making pretzels from dough sticks comprising a pretzel tying unit, means to deliver dough sticks to the tying unit, said tying unit comprising a tamper foot to press the end of the stick against the body of the stick and means for adjusting the stroke of the tamper to accommodate different thicknesses of sticks.

20. In a pretzel machine, a pretzel tying mechanism, means for delivering a dough stick to the tying mechanism, a knife for cutting the end of the dough stick after it has been delivered to the tying means, and a single cam to actuate the stick delivery means and the knife.

21. In a pretzel making machine, a pretzel tying mechanism, means for delivering a dough stick to the tying means, knives for cutting the ends of the dough stick, a cam for actuating the tying means, and a second cam for actuating the knives.

22. In a pretzel making machine, the combination of a cutter for severing lumps of dough from a dough stream, rolling means to form sticks from successive lumps of dough, mechanism to convert the dough sticks into pretzel form, means to deliver the sticks to the converting mechanism, said converting mechanism including a movable element, a device associated with the element for actuating the cutter in timed relation to a complete cycle of the converting mechanism and means to vary the operative position of said device with respect to the movable element.

23. In a pretzel making machine, the combination of a cutter for severing lumps of dough from a dough stream, rolling means to form sticks from the successive lumps of dough, pretzel forming mechanism means to deliver the sticks from the rolling means to the pretzel forming mechanism, said pretzel forming mechanism including a rotating shaft having a period of its revolution corresponding with a complete cycle of the pretzel forming mechanism, means cooperating with said shaft for actuating the cutter and means for adjusting the relation of the shaft and said cooperating means to vary the instant of operation of the cutter.

24. In a pretzel making machine, the combination of a cutter for severing lumps of dough from a dough stream, rolling means to form sticks from the successive lumps of dough, pretzel forming mechanism, means to deliver the sticks from the rolling means to the pretzel forming mechanism, said pretzel forming mechanism including a rotating shaft having a period of its revolution corresponding with a complete cycle of the pretzel forming mechanism, means movable independently of the shaft and cooperating with the shaft for actuating the cutter and means for adjusting the relation of the shaft and said cooperating means to vary the instant of operation of the cutter.

25. In a pretzel making machine, the combination of a cutter for severing successive lumps of dough from a dough stream, rolling means for forming sticks from the successive lumps of dough, mechanism to convert the dough sticks into pretzel form, means to deliver the sticks to the converting mechanism, said converting means including a movable element, a device associated with the element for actuating the cutter in timed relation to a complete cycle of the converting mechanism and means adjustable independently of the said element for varying the instant at which said device is actuated with relation to the cycle of the converting mechanism.

26. In a pretzel making machine, the combination of a cutter for severing successive lumps of dough from a dough stream, rolling means for forming sticks from the successive dough lumps, mechanism to convert the sticks into pretzel form, means to deliver the sticks to the converting mechanism, said converting means including a cam for controlling the cycle of the converting means, a formation on the cam and a device for actuating the cutter located in the path of said formation and operated thereby.

MILLARD F. WEIDA.